Inventor:
Walter Villmann.
By: [signature] Atty.

Inventor:
Walter Villmann
By [signature] Atty

Nov. 18, 1958 W. VILLMANN 2,861,131

AUTOMATIC TELEPHONE SYSTEM

Filed May 11, 1954 9 Sheets-Sheet 3

Inventor.
Walter Villmann.
By. [signature] Atty.

Nov. 18, 1958 W. VILLMANN 2,861,131

AUTOMATIC TELEPHONE SYSTEM

Filed May 11, 1954 9 Sheets-Sheet 4

Inventor.
Walter Villmann.
By. [signature] Atty.

Nov. 18, 1958 W. VILLMANN 2,861,131

AUTOMATIC TELEPHONE SYSTEM

Filed May 11, 1954 9 Sheets-Sheet 5

Inventor.
Walter Villmann.
By. [signature] Atty.

Nov. 18, 1958 W. VILLMANN 2,861,131

AUTOMATIC TELEPHONE SYSTEM

Filed May 11, 1954 9 Sheets-Sheet 6

Inventor:
Walter Villmann.
By [signature] Atty.

Nov. 18, 1958 W. VILLMANN 2,861,131

AUTOMATIC TELEPHONE SYSTEM

Filed May 11, 1954 9 Sheets-Sheet 7

Inventor:
Walter Villmann.
By [signature] Attys.

Nov. 18, 1958 W. VILLMANN 2,861,131
AUTOMATIC TELEPHONE SYSTEM
Filed May 11, 1954 9 Sheets-Sheet 8

Inventor:
Walter Villmann.
By [signature] Atty.

Nov. 18, 1958 W. VILLMANN 2,861,131

AUTOMATIC TELEPHONE SYSTEM

Filed May 11, 1954 9 Sheets-Sheet 9

Inventor:
Walter Villmann.

By. [signature] Atty.

2,861,131

AUTOMATIC TELEPHONE SYSTEM

Walter Villmann, Munich, Germany, assignor to Siemens & Halske Aktiengesellschaft, Munich, Germany, a corporation of Germany Application May 11, 1954, Serial No. 429,031

Claims priority, application Germany January 27, 1954

14 Claims. (Cl. 179—90)

Figure 1:
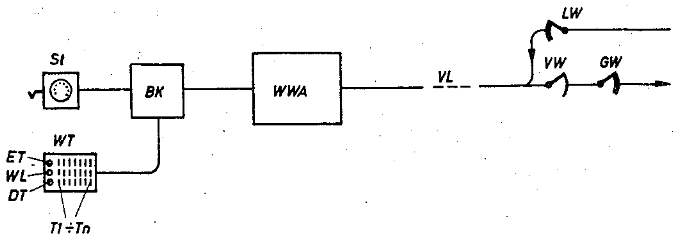

This invention relates to signalling systems and is particularly concerned with an automatic telephone system.

There are selection devices known, for use in systems of the above-noted type, for automatically selecting certain subscribers' stations responsive to a switching operation initiated by a calling subscriber. There are also devices known for automatically supervising the operating condition of a desired subscriber's station, responsive to a switching operation of a calling subscriber, by evaluating various distinguishing signals received from the far end of a connection. These devices which will be referred to as selection repeating robot apparatus are adapted for repeatedly building up the corresponding call so long as the desired station is busy and to signal the calling party when the desired stations becomes idle.

The present invention is concerned with circuit arrangements for use in signalling systems and particularly automatic telephone systems comprising selection as well as selection repeating robot apparatus. The functioning of the corresponding equipment requires various operations by the calling subscriber. The first operation resides in removing the hand set so as to receive the dial tone. The second operation resides in the actuation of a device, for example, the depressing of a selection key which is associated with a certain desired subscriber's station. This operation initiates the operations of the selection apparatus. The calling subscriber awaits the building up of the call and if he receives the busy tone, he prepares the selection repeating robot apparatus for its functioning by a third operation which may reside, for example, in the actuation of a grounding key. The functioning of the selection repeating robot apparatus is initiated responsive to a fourth operation which resides in the replacement of the hand set by the calling subscriber. The fifth operation required of the calling subscriber resides in the removal of the hand set upon receipt of the call signal from the selection repeating apparatus signifying that the called subscriber is available.

The circuit arrangement according to the present invention distinguishes from prior arrangements among others by the fact that the operations of the selection apparatus and of the selection repeating apparatus require only a single operation of the calling party. The switching operation by which the selection operations of the selection apparatus are in generally known manner initiated also control the functioning of the selection repeating apparatus.

The desired connection is in accordance with the invention built up solely by the actuation of the selection key, by the calling party, which is associated with or allotted to the called party. The desired line is thereupon automatically selected and the selection repeating robot apparatus supervises the operating condition thereof. As soon as the called line is idle, the selection repeating apparatus will signal the calling subscriber who removes his hand set and thus obtains the connection which has already been completed. Compared with prior arrangements, there are only three switching operations required of the calling party instead of five as before, namely, initial removal of the hand set, actuation of the selection key, and subsequent removal of the hand set to accept the completed connection.

Figure 3:
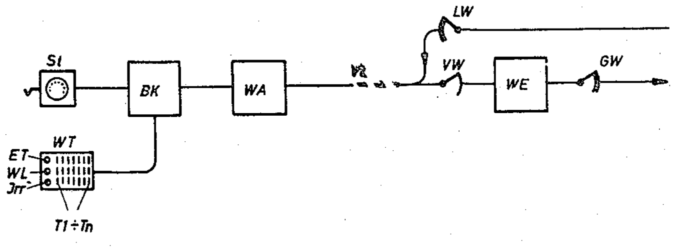
Figures 4, 4A:
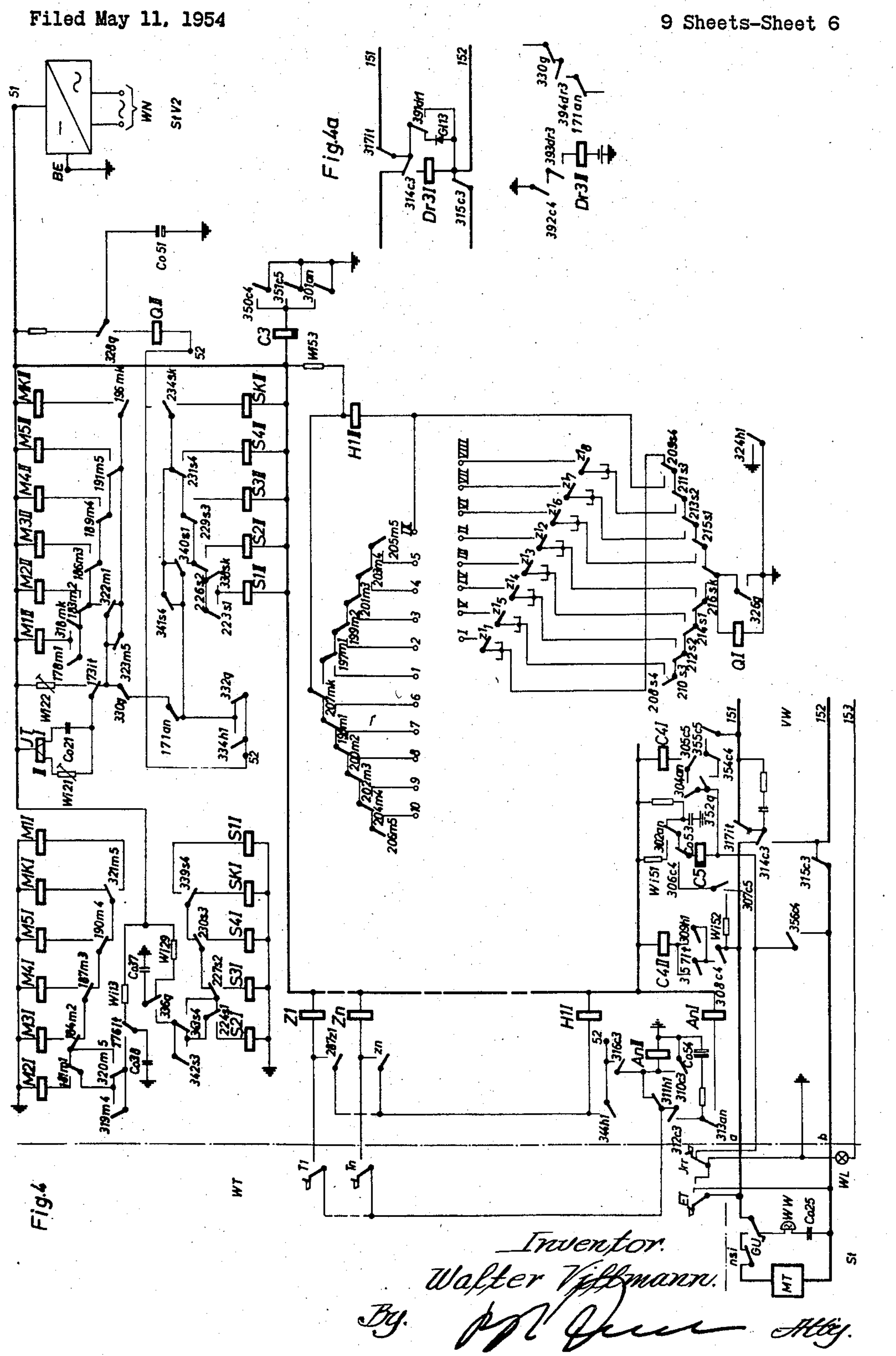

The invention and its various objects and features will now be explained with reference to the accompanying drawings in which:

Fig. 1 is a general diagram;

Figs. 2*a* to 2*d* placed side by side with identically marked conductors in alignment show details of the selection apparatus and of the selection repeating apparatus forming the unit WWA of Fig. 1;

Fig. 3 represents another general diagram;

Figs. 4 and 4*a* illustrate the selection apparatus or device WA of Fig. 3; and

Figure 5A:
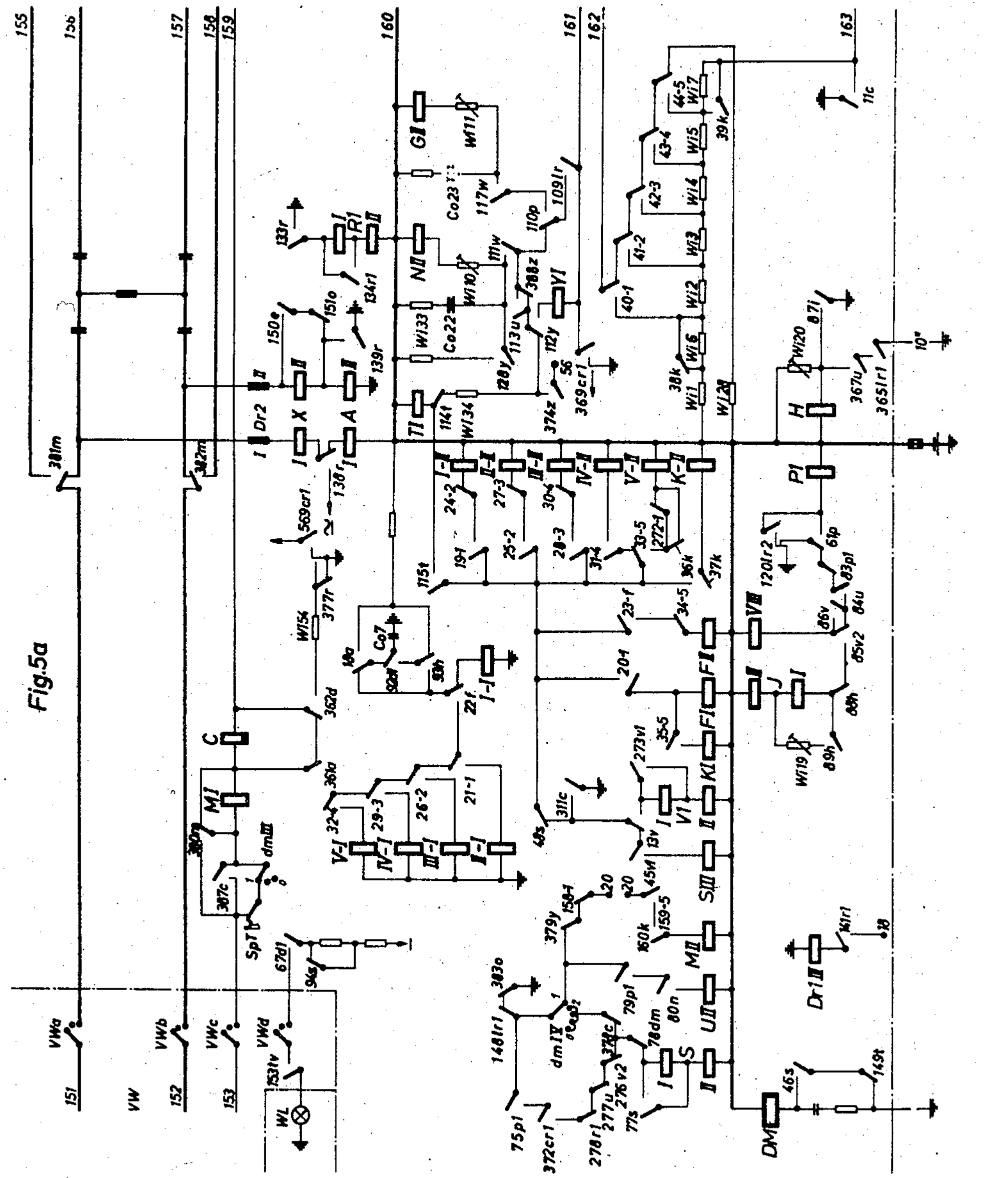
Figure 5B:
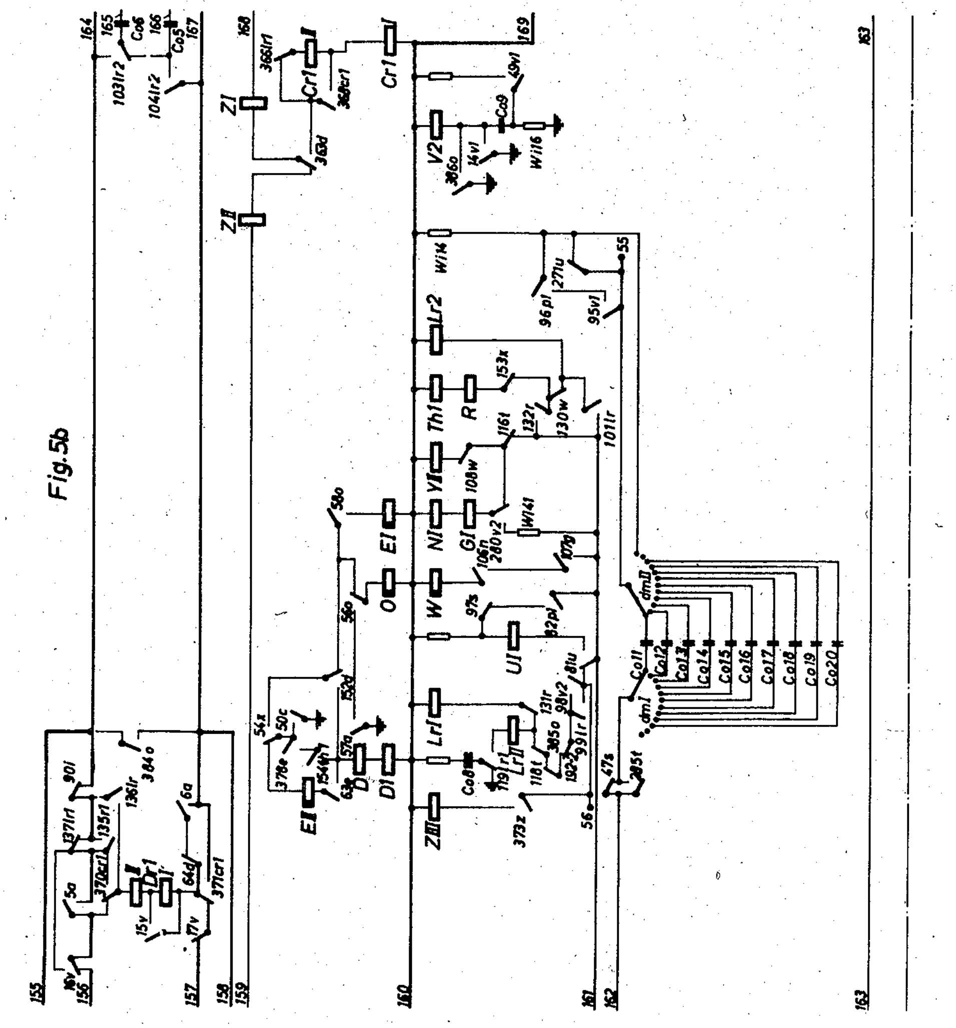
Figure 5C:
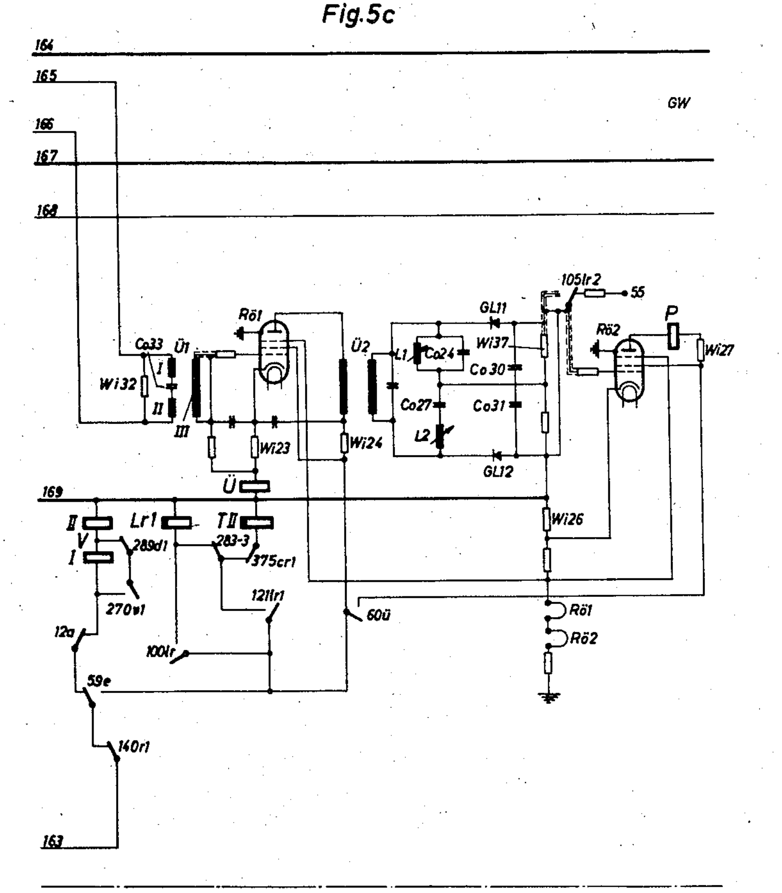

Figs. 5*a* to 5*c* placed side by side with identically marked conductors in alignment show details of the selection repeating robot apparatus or device WE of Fig. 3; the selection device being in this embodiment separate from the selection repeating device and connected together by suitable preselectors.

The figures show only the circuit details required for an understanding of the invention. Switching means and contacts having largely identical functions are similarly shown throughout the drawings.

Referring now to Fig. 1, there is a subscriber's line VL which is in usual manner connected in the exchange with the preselector VW and with the bank multiple of connectors L. The line VL extends to the exchange by way of in the combined selection device and selection repeating device WWA. Connected with WWA by way of a switch box BK is a customary subscriber's station and a key set WT. The latter is provided with a number of selection keys T1 to T*n* which are respectively associated with predetermined lines, a grounding key ET, a lamp WL which indicates the selection repeating condition of the combined selection and selection repeating device and also the busy condition of the desired line, respectively, and the rotary key DT.

The operation of the various switching means of Fig. 1 will now be described with reference to Figs. 2*a* to 2*d* showing details of the selection and selection repeating device WWA of Fig. 1.

Figure 2A:
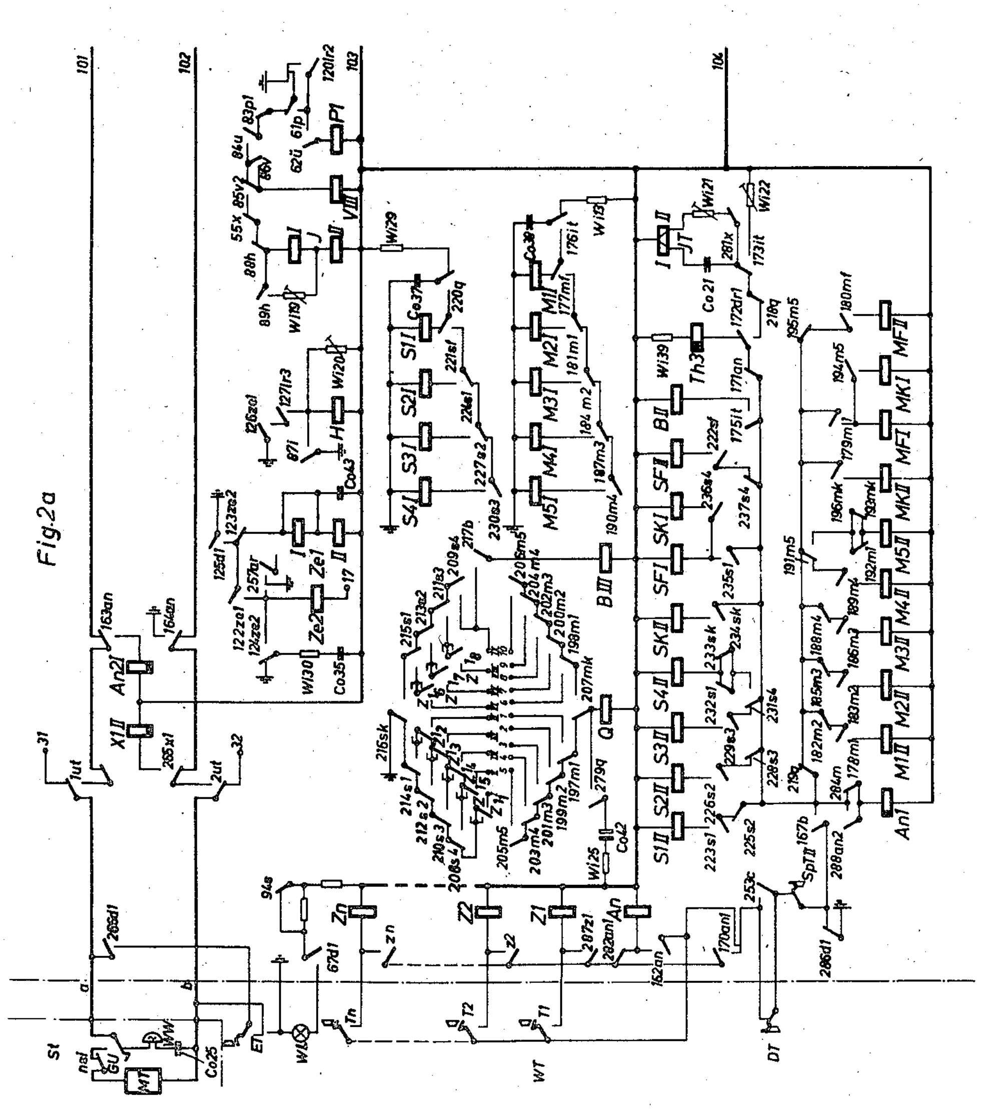

Fig. 2*a* shows among other parts the subscriber stations *St* with the switch hook contacts GU, ringer WW, dial impulse contact *nsi*, and the unit MT which comprises the microphone, the repeater coil, the line resistor, etc., all of which are constructed in accordance with standard practice. The figure also shows underneath the station *St* the key set WT (of Fig. 1) with its selection keys T1 to T*n*, the grounding key ET, the lamp WL and the rotary key DT.

Figure 2B:
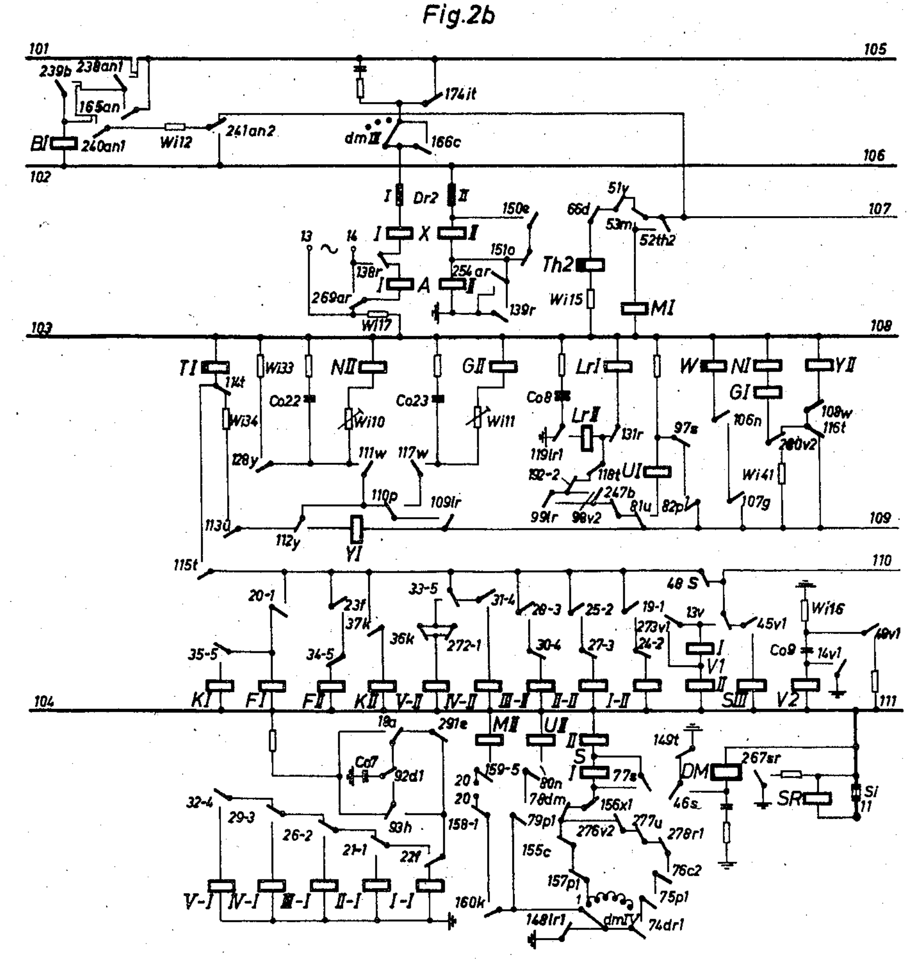
Figure 2C:
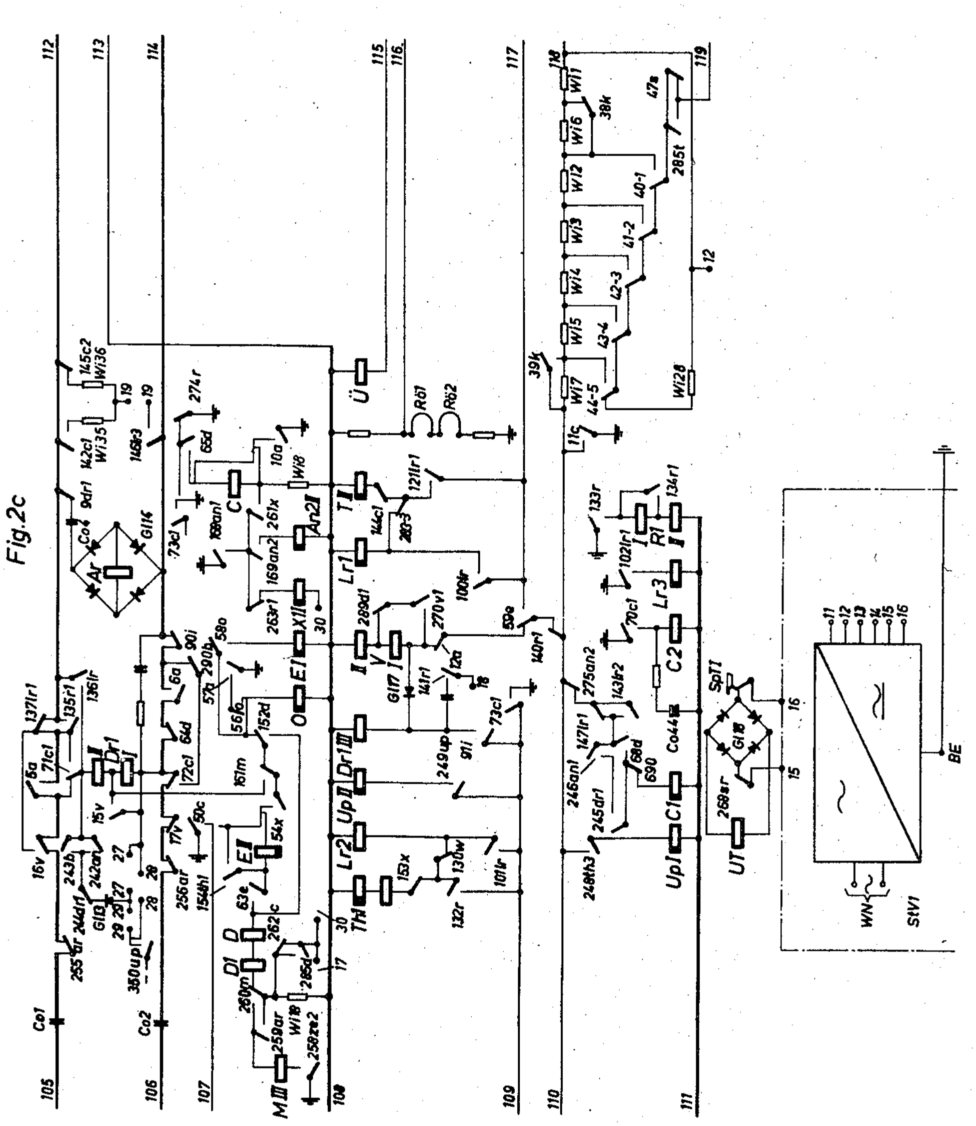
Figure 2D:
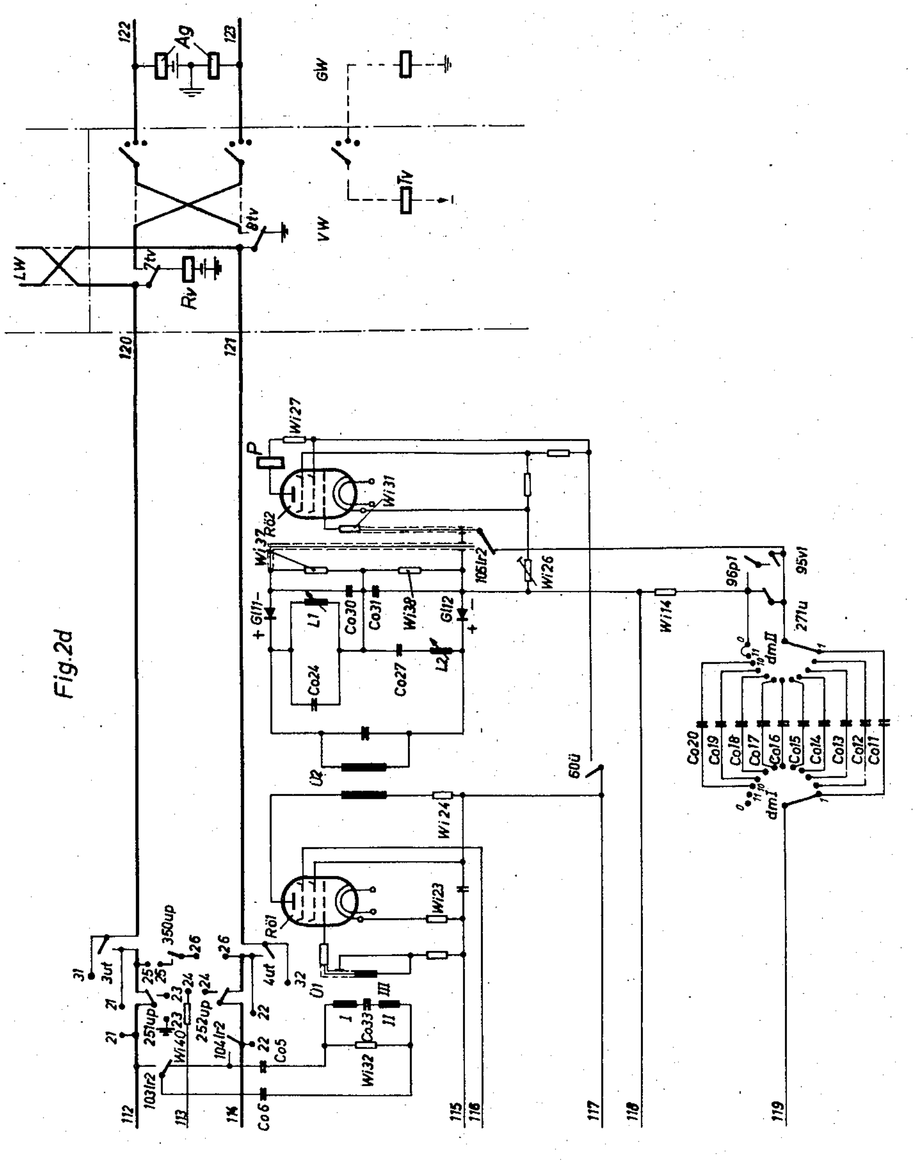

Fig. 2*d* shows among others, parts of the line circuit in the exchange comprising the preselector VW, the battery feed bridge A*g* of the group selector GW, and the line conductors from the connector LW.

At the bottom of Fig. 2*c* is shown the current supply StV1 for the combination selection-selection repeating device, the inlet of which is connected to the commercial A. C. source WN and which delivers at 11 direct current, for example, —60 volt, at 12 direct current, for example, —100 volt (both with reference to the grounding terminal BE) further delivering at 13 and 14 alternating ringing current, and at 15 and 16 alternating current for supervisory purposes. When the selection-selection repeating device is prepared for operation, the supervisory relay UT is energized by way of the recifier G118 which are connected to the terminals 15 and 16; its contacts 1*ut* and 2*ut* (top of Fig. 2*a*) as well as 3*ut* and 4*ut* (top of Fig. 2*d*) are therefore in operated position.

1.100 Selection by use of the dial of the subscriber's station

The building up of a connection by selection of the desired line by the use of the dial at the subscriber's station will be described first so as to facilitate the understanding of the circuits. The switching operations correspond essentially to those in prior systems.

1.101 Seizure

The subscriber's loop is closed over the switch hook contacts GU responsive to the removal of the hand set at the station *St* (Fig. 2*a*). Relay A (Fig. 2*b*) energizes in a circuit:

1.101/1: over resistor W*i*17 in Fig. 2*b*, 269*ar*, winding I of A, 138*r*, winding I of X, I of D*r*2, *dm*III, 174*it*, 238*an*1, conductor 101 to Fig. 2*a*, 163*an* (Fig. 2*a*), 264*x*1, 1*ut* (relay UT in Fig. 2*c* being energized), line conductor *a*, switch hook contact GU, contact *nsi*, MT, line conductor *b*, 2*ut* (relay UT in Fig. 2*c* energized), 265*x*1, 164*an*, conductor 102 to Fig. 2*b*, coil II of D*r*2, winding II of X, winding II of A, to ground. The windings I and II of the relay X are connected in opposition and relay X therefore remains at rest. The contacts of the relay A (Fig. 2*b*) marked at the top of Fig. 2*c* by 5*a* and 6*a* are in actuated position responsive to energization of relay A (Fig. 2*b*) and close the loop to the preselector VW in Fig. 2*d* over the circuit:

1.101/2: from battery, relay R*v* (Fig. 2*d*), 7*tv*, conductor 120, 3*ut* (relay UT in Fig. 2*c* being energized), 251*up*, conductor 112 to Fig. 2*c*, 137*r*1, 5*a*, 71*c*1, winding 11 of D*r*1, winding I of D*r*1, 64*d*, 6*a*, conductor 114 to Fig. 2*d*, 252*up*, 4*ut*, conductor 121, 8*tv*, to ground.

The line relay R*v* of the preselector VW, Fig. 2*d*, energizes. The preselector seizes a group selector GW in known manner.

The relay D*r*1 (Fig. 2*c*) disposed in the outgoing line loop energizes upon closure of the contacts 5*a* and 6*a* of relay A (Fig. 2*b*). Its contact 9*dr*1 opens and disconnects the relay A*r* (Fig. 2*c*).

Contact 10*a* of the relay A closes an energizing circuit for the private relay C shown at the top right of Fig. 2*c*. The corresponding circuit 1.101/3 may be traced in Fig. 2*c* from battery, resistor W*i*8, winding of relay C, actuated contact 10*a*, to ground.

The contact 11*c* (bottom right of Fig. 2*c*) actuated by relay C connects a voltage divider comprising the resistors W*i*1 to W*i*7, which is connected with the power supply *St*V1 over the terminal 12. The corresponding circuit 1.101/4 extends from —100 volts on terminal 12, resistor W*i*1, closed contact 38*k*, resistors W*i*2 to W*i*5, resistor W*i*7, contact 11*c*, to ground.

The seizure is now completed. The dial tone or the group selector busy tone is in known manner inductively transmitted to the calling subscriber over a circuit:

1.101/5, over the relay A*g* (Fig. 2*d*), contact 7*tv*, conductor 120, contacts 3*ut* (relay UT, bottom of Fig. 2*c* energized), 251*up*, conductor 112 to Fig. 2*c*, 137*r*1 (Fig. 2*c*), 5*a* (relay A, Fig. 2*b*, energized), 16*v*, 255*ar*, capacitor C*o*1, conductor 105 to Fig. 2*b*, 238*an*1 (Fig. 2*b*), conductor 101 to Fig. 2*a*, 163*an* (Fig. 2*a*), 264*x*1, 1*ut* (relay UT, Fig. 2*c*, energized), line conductor *a*, switch hook contacts GU of the subscriber's station, dial contacts *nsi*, MT, line conductor *b*, 2*ut* (of energized relay UT), 265*x*1, 164*an*, conductor 102 to Fig. 2*b*, conductor 106 to Fig. 2*c*, capacitor C*o*2 (Fig. 2*c*), 256*ar*, 17*v*, 72*c*1, 64*d*, 6*a* (of energized relay A in Fig. 2*b*), 90*i*, conductor 114 to Fig. 2*d*, 252*up* (Fig. 2*d*), 4*ut* (of energized relay UT), 8*tv*, winding of A*g*.

1.102 Number selection

The calling subscriber will hear the dial tone after the preselector VW (Fig. 2*d*) has found an idle group selector and he can now dial the desired number. The impulses produced by the corresponding opening of the dial contacts *nsi* (Fig. 2*a*) will successively release the line relay A (Fig. 2*b*). Its contact 6*a* (Fig. 2*c*) transmits these impulses to the group selector GW (Fig. 2*d*) by interruption of the corresponding line loop. Relay C (Fig. 2*c*) remains energized during the operations of relay A because it is made slow-to-release by contact 10*a*. Upon first deenergization of relay A (Fig. 2*b*), a circuit will be closed over contact 12*a* for energizing the relay V (central part of Fig. 2*c*) namely, 1.102/1, from ground at 11*c*, 140*r*1, 59*e*, windings I and II of relay V in series, to battery on conductor 108.

The energization of relay V causes closure of contact 13*v* and therewith energization of relay V1 (lower part of Fig. 2*b*) in a circuit 1.102/2—Fig. 2*b*, from battery, windings II and I of relay V1 in series, contact *v*13, conductor 110 to Fig. 2*c*, contact 11*c*, to ground.

Relay V1 (Fig. 2*b*) closes its contact 273*v*1 to shunt its winding I so as to make itself slow-to-release and also closes its contact 270*v*1 (Fig. 2*c*) so as to shunt the winding I of relay V, thus making this latter relay also slow-to-release. This release delay for relays V and V1 bridges the intervals between the dial pulses and keeps these relays (V and V1) energized during the dialing of the desired number. Contact 14*v*1 of relay V1 closes a circuit for energizing relay V2 (right lower part of Fig. 2*b*) over a circuit 1.102/3 from ground, contacts 14*c*1, winding of V2 to battery on conductor 104.

Relay V upon actuating also operates its contact 15*v* to shunt the winding I of relay D*r*1 (Fig. 2*c*) during the dialing. A holding circuit is at the same time closed for the relay D*r*1 so that it remains operated during the transmission of the dial pulses. The holding circuit may be traced 1.102/4, in Fig. 2*c*, from ground on contact 11*c* (right lower part of Fig. 2*c*), contacts 140*r*1, 59*e*, 12*a*, rectifier G117, winding III of relay D*r*1 (marked D*r*1III) to battery on conductor 108.

The contacts 16*v* and 17*v* of the operated relay V open the line conductors 112 and 114 (Fig. 2*c*) during the transmission of the dial pulses.

1.103 Storing of the dialed number

The selection-repeating device has to re-transmit the dialed number automatically, if necessary, and the corresponding impulse series are therefore stored. A storing circuit is provided for this purpose which comprises essentially the relays I to V, F and K and a rotary switch DM shown in Fig. 2*b* and the high grade capacitors C*o*11 to C*o*20 shown in Fig. 2*d*.

The relays I to V having the windings I–I to V–I in Fig. 2*b*, form a counting chain which is in steplike fashion actuated by the discharge current from the capacitor C*o*7, over the contact 18*a* of the line relay A. Upon first deenergization of the relay A, responsive to the first dial pulse, the relay I will be energized over its winding I marked at the bottom of Fig. 2*b* by I–I. The second windings of the relays I–V, marked I–II . . . V–II, are shown in Fig. 2*b* directly above the battery conductor 104. Relay I, upon energizing over its winding I–I closes a holding circuit for itself which extends over its contact 19–1 and its second winding I–II. At its contact 20–1, relay I closes a circuit for energizing the relay F (winding FI) which closes its contact 23*f* to complete a holding circuit for itself over its second winding FII. Relay II is energized responsive to the next deenergization of relay A in a circuit over the contacts 22*f* and 21–1 which are in working position, and the relay accordingly closes its contact 25–2 to complete a holding circuit for itself over its winding II. At contact 24–2, relay II opens the holding circuit of relay I and the latter deenergizes. Relay IV will be energized responsive to the fourth deenergization of relay A. At its contact 31–4, relay IV completes a holding circuit for itself over its winding II. Relay V energizes in a circuit over contact 34–4 responsive to the fifth deenergization of relay A. At its contact 35–5, relay V opens the holding circuit of relay IV, at the same time completing over such contact 35–5 a holding circuit for itself over its winding II. At contact 34–5, relay V disconnects relay F and the latter closes upon deenergization its contact 22*f*. Relay I is accordingly reenergized responsive to the sixth deenergization of relay A and closes at contact 20–1 a circuit for reenergizing relay F. Since relay V is operated and its contact 35–5 closed, relay K will also be energized upon closure of contact 20–1 of relay I. Relay K closes its contact 37–*k* to complete a holding circuit for its winding II. Relay V is disconnected at contact 36–*k*. Contact 272–1 of the relay I has been opened before. The operation of the counting chain responsive to the sixth to tenth dial pulse corresponds to its operation responsive to the first to fifth dial pulse, with the difference that the relay K is actuated.

The voltage divider (Fig. 2*c*) comprises resistors W*i*1 to W*i*5 of identical resistance and resistors W*i*6 to W*i*7, each having a resistance which is five-times that of any of the resistors W*i*1 to W*i*5. The direct voltage of, for example, 100 v., delivered by the power supply S*t*V1 at the terminal 12 is divided by this voltage divider into ten equal parts. There is therefore from one terminal to the next a potential difference of 10 v. The voltage at the resistors W*i*6 and W*i*7, respectively, is in each case 50 v.

The counting chain comprising the relays I to V (Fig. 2*b*) connects by way of the wipers *dm*I and *dm*II (Fig. 2*d*) of the switch DM (Fig. 2*b*) a potential to the respective storage capacitors C*o*11 to C*o*20 which respectively corresponds to the number of impulses of an impulse series. For example, if the first digit dialed by the calling party is "1," a potential of 10 v. is impressed upon the capacitor C*o*11 over the contact 40–1 (Fig. 2*c*) of relay I (Fig. 2*b*) which potential is taken from the resistor W*i*1. The corresponding circuit 1.103/1, may be traced from W*i*1 (Fig. 2*b*), 118, W*i*14 (Fig. 2*d*), 271*u*, *dm*II, C*o*11, *dm*I, 119, 47*s* (Fig. 2*c*), 40–1, 38*k* to W*i*1.

Upon dialing the digit "5," the storage capacitor will receive the potential 50 v. from the resistors W*i*1+2+3+4+5 over contact 44–5 of the relay V in a circuit 1.103/2, extending from W*i*1 (Fig. 2*c*), 118, W*i*14 (Fig. 2*d*), 271*u*, *dm*II, C*o*11, *dm*I, 119, 47*s* (Fig. 2*c*), 44–5, W*i*5.

When the digit "6" is dialed, the relay K will be actuated with the relay I, as explained before, and the contacts 38*k* and 39*k* will accordingly be actuated. The storage capacitor will then receive the potential 60 v. over contact 40–1, from the resistors W*i*1+6, in a circuit 1.103/3, extending from W*i*1 (Fig. 2*c*), 118, W*i*14 (Fig. 2*d*), 271*u*, *dm*II, C*o*11, *dm*I, 119, 47*s* (Fig. 2*c*), 40–1, W*i*6.

The relay A is energized at the conclusion of each impulse series and the relays V and V1 will successively deenergize with some delay. Responsive to deenergization of relay V and during the deenergization interval of V1, relay S will be energized over the contacts 13*v* and 45*v*1, in a circuit 1.103/4, extending from battery (Fig. 2*b*), SIII, 45*v*1, 13*v*, 110, 11*c* (Fig. 2*c*) to ground.

Relay S actuates its contact 46*s* to step the rotary switch DM by one further step, in a circuit 1.103/5, extending from battery (Fig. 2*b*), DM, 46*s*, 149*t* to ground.

At contact 47*s*, the relay S at the same time disconnects the charge potential from the switch wiper *dm*I of the switch DM. At contact 48*s*, relay S disconnects the relays I to V, F and K of the counting chain.

Similar operations take place when the calling subscriber dials the second digit. The corresponding potential is now stored in the capacitor C*o*12. There are ten storage capacitors permitting storage of ten-digit subscribers' numbers.

1.104 The called subscriber answers

If the called subscriber answers, there will be no need for utilizing the digits dialed by the calling party, designating his station and stored as explained before. The relays V, V1 and V2 deenergize and the rotary switch DM remains with its wipers in the position to which they were advanced incident to the dialing of the last digit of the desired number. The thermo relay T*h*2 (Fig. 2*b*) is connected responsive to deenergization of relay V; it attracts its armature after an interval of 30 to 40 sec. and at its contact 52*th*2 switches in the relay M which completes a holding circuit for itself at contact 53*m* while disconnecting the thermo relay T*h*2. The corresponding circuit 1.104/1 extends from battery (Fig. 2*b*), W*i*15, T*h*2, 66*d*, 51*v*, 53*m*, 107, 50*c* (Fig. 2*c*) to ground.

Once the relay M has energized, there is no more possibility to initiate the selection repeating condition.

1.105 Initiation of the waiting condition

If the called subscriber is busy, the calling party will receive the busy tone. In order to initiate the selection repeating condition, the calling party depresses the grounding key ET of his key set before relay M has energized. Ground is thus connected to the line conductor 102 to shunt winding II of the differential relay X. The latter relay energizes and at contact 54*x* connects relay O. The circuits to be considered are 1.105/1 extending from battery (Fig. 2*b*), W*i*17, 269*ar*, AI, 138*r*, XI, D*r*2I, 166*c*, 174*it*, 238*an*1, 101, 163*an* (Fig. 2*a*), 264*x*1, 1*ut*, *a*, GU, *nsi*, MT, ET to ground.

1.105/2, from battery (Fig. 2*c*), O, 560, 152*d*, 161*m*, 54*x*, 50*c* to ground.

Relay O closes a holding circuit for itself over its contact 56*o* and contact 57*a*. At contact 58*o* it connects the relay E in a circuit 1.105/3, from battery (Fig. 2*c*), EI, 58*o*, 152*d*, 161*m*, 54*x*, 50*c* to ground.

Contact 59*e* of the relay E places ground potential on the plate of the tube R*o*1 and relay Ü energizes in the circuit 1.105/4 from battery (Fig. 2*c*), Ü, 115, W*i*23 (Fig. 2*d*,) R*o*1, Ü2, W*i*24, 117, 59*e* (Fig. 2*c*), 140*r*1, 11*c* to ground.

Relay Ü upon energizing connects at its contact 60*ü* ground to the plate of tube R*o*2 so that relay P is actuated in a circuit 1.105/5 extending from 12 (Fig. 2*c*), 118, W*i*26 (Fig. 2*d*), R*o*2, P, W*i*27, 60*ü*, 117, 59*e* (Fig. 2*c*), 140*r*1, 11*c* to ground.

The relays P and Ü connect the relay P1 in a circuit 1.105/6 from battery (Fig. 2*a*), P1, 62*ü*, 61*p*, 120*r*2 to ground.

Relay X deenergizes after release of the key ET and connects the relays D and D1. Relay E continues to hold in the energizing circuit of these relays until the waiting condition is concluded, the circuit to be considered being 1.105/7 extending from battery (Fig. 2*c*), W*i*18, 260*m*, D1, D, 63*e*, EII, 54*x*, 50*c* to ground.

Contact 64*d* of relay D opens the outgoing line loop and thereby releases the connection. Relay D*r*1 deenergizes. A new holding path for relay C is closed by contact 65*d*, in a circuit 1.105/8 from battery (Fig. 2*c*), W*i*8, C, 65*d*, 274*r* to ground.

Contact 66*d* upon opening prevents energization of the thermo relay T*h*2 (Fig. 2*b*). Contact 67*d*1 completes a circuit for the lamp WL in the key set WT, Fig. 2*a*). The calling subscriber is thus informed that the selection repeating device is in repeating condition.

1.106 Selection repeating device repeats building up of call

After depressing the key ET, the subscriber replaces the hand set. The switch hook contacts GU open the subscriber's loop. The line relay A in the selection device deenergizes. Its contact 57*a* opens the holding circuit for the relay O (Fig. 2*c*). Relay C1 is now connected over contact 69*o* in a circuit 1.106/1 from battery (Fig. 2*c*), C1, 69*o*, 68*d*, 1471*r*1, 275*an*2, 11*c* to ground.

Contact 70*c*1 connects the relay C2 (Fig. 2*c*). The contacts 71*c*1 and 72*c*1 close the loop to the preselector VW again. The relay D*r*1 is again energized.

The relays N and G of the call separator are now connected by contact 73*c*1 in a circuit 1.106/2 from battery (Fig. 2*b*), $\frac{\text{YII}}{\text{NI, GI}}$, $\frac{108w}{280v2}$, 116*t*, 109, 73*c*1 (Fig. 2*c*) to ground.

Relays N and G connect at their respective contacts 106*n* and 107*g* the relay W (Fig. 2*b*).

The rotary switch DM must be operated to restore it to home position "I" before the selection of the called line is repeated. This is accomplished by means of the relay S which is connected by contact 76*c*2 of the relay C2 over the circuit 1.106/3 from battery (Fig. 2*b*), SII, SI, 156*x*1, 78*dm*, 276*v*2, 277*u*, 278*r*1, 76*c*2, 75*p*1, 74*dr*1, 148*r*1 to ground.

Contact 78*dm* is controlled by the armature of the rotary switch DM. Relay S connects at its contact 46*s* the drive magnet of the rotary switch (Fig. 2*b*). The contact 78*dm* interrupts the energizing circuit of relay S which deenergizes with some delay because it has shunted its low resistance winding I at the contact 77*s*. The rotary magnet DM is thus again disconnected. The interplay between the rotary magnet DM and the relay S drives the rotary switch into its home position 1 in which it is stopped by the relay U. The latter is energized in a circuit over the wiper *dm*IV and opens the energizing circuit of relay S at contact 277*u*, the circuit to be considered being 1.106/4, extending from battery (Fig. 2*b*), UII, 80*n*, 79*p*1, *dm*IV, 1481*r*1 to ground.

1.107 First repetition of the selection by the repeating device

The capacitor C11 which carries the stored potential is in position "1" of the rotary switch DM connected with the wipers *dm*I and *dm*II (Fig. 2*d*). As soon as the contact 47*s* of the relay S has closed again, the stored charge of this capacitor is conducted as a negative grid potential to the control grid of the tube R*o*2 and such tube is thereby blocked, the circuit to be considered being 1.107/1, which extends from 12 (Fig. 2*c*), W*i*28, 44–5, 43–4, 42–3, 41–2, 40–1, 47*s*, 119, *dm*I (Fig. 2*d*), C*o*11, *dm*II, 1051*r*2, W*i*31, control grid of the tube R*o*2.

Relay P and subsequently P1 deenergize. Contact 82*p*1 frees the winding I of the relay U which had been shunted. Relay U continues to hold over its contact 81*u* and its winding I (Fig. 2*b*). Relay V is again energized over contact 83*p*1 and closed contact 84*u* in a circuit 1.107/2 from battery (Fig. 2*a*), VIII, 85*v*2, 84*u*, 83*p*1, 61*p*, 1201*r*2 to ground.

The relay V continues to hold over its contacts 86*v* and connects at its contact 13*v* the relay V1 which in turn connects the relay V2 (Fig. 2*b*) at its contact 14*v*1. Relay J is now connected by contact 85*v*2 and in interplay with the relay H (Fig. 2*a*) in a circuit 1.107/3 from battery (Fig. 2*a*), JII, JI, 88*h*, 55*x*, 85*v*2, 86*v*, 84*u*, 83*p*1, 61*p*, 1201*r*2 to ground.

Contact 87*i* of the relay J connects the relay H. The contact 88*h* of the latter disconnects the relay J (Fig. 2*a*). The energization and deenergization intervals of H and J can be adjusted by the regulating resistors W*i*19 and W*i*20 in such a manner that the contact 90*i* of the relay J (Fig. 2*c*) transmits the required impulses.

The winding III of the relay D*r*1 is energized over contact 91*i* of the relay J (Fig. 2*c*) responsive to each impulse. The relay remains operated because it is made slow-to-release by the shunt of its low resistance winding I over contact 15*v* (Fig. 2*c*).

The contact 18*a* (Fig. 2*b*) of the line or impulse relay A controlled the relays I to V, F and K by the discharges of the capacitor C*o*7 incident to the previously described storing of the desired subscriber's number, and the contact 93*h* which is connected over contact 92*d*1 now controls these relays in a similar manner. The contacts 40–1 to 44–5, 38*k* and 39*k* (Fig. 2*c*) now connect a compensation potential, in opposition to the charge potential of the respective storage capacitor, which is increased always by 10 v. from impulse to impulse, until the charge potential and the compensation potential cancel each other. The relay J produces a number of impulses which is equal to the impulses previously dialed by the calling party and stored as described before. The potential at the control grid of the tube R*o*2 then becomes zero and the relay P as well as the relay P1, dependent on P, are again actuated. Contact 61*p* disconnects the relay V (Fig. 2*a*). The relays V1 and V2 which depend on V deenergize again. Contact 276*v*2 connects the relay S which steps the rotary switch to the next position by actuating its contact 46*s*. The relays P and P1 thereupon deenergize provided that the storage capacitor which happens to be connected carries a charge potential. The opening of contact 75*p*1 interrupts the energizing circuit of the relay S and subsequently that of the rotary magnet DM (Fig. 2*b*). The resistance in the circuit of the lamp WL (Fig. 2*a*) is altered by contact 94*s* whenever the relay S energizes. The unsteady operation of the lamp WL indicates to the subscriber that the repeating device is in operation.

The switching operations occurring after the next storage capacitor has been connected correspond to those already described, with the sole difference that the relay V can energize and prepare for the connection of the impulse relay J only after the relay V2, which has a strong release delay due to resistor 16 and capacitor C*o*9 has returned to normal. The release interval of the relay V2 simulates the required pauses between the individual selection impulse series.

The storage capacitors C*o*11 to C*o*20 will lose part of their charges in spite of their very good insulation, if the selection repeating device repeats the building up of the connection for some time, and there accordingly is the danger of wrong selection. Each storage capacitor therefor is recharged at the end of the selection impulse series whose transmission is controlled by a charge potential. This is accomplished over contacts 95*v*1 and 96*p*1 (Fig. 2*d*) which connect a potential after grid-blocking potential for the tube R*o*2 has been compensated by the opposing potential obtained from the voltage divider W*i*1 to W*i*7 (Fig. 2*c*). At this instant there is so far as the charge potential at the respective storage capacitors is concerned the same condition as incident to the original storing.

The danger of false connection or rather to say, selection, is also present if there are considerable current fluctuations in the power supply. In order to overcome this danger, the voltage for the voltage divider W*i*1 to W*i*7 (Fig. 2*c*) is in particularly suitable manner obtained from a glow discharge tube which holds the voltage constant. This glow discharge tube (not shown) is disposed in the power supply portion S*t*V1 between the terminals 12 and BE. A detailed showing of this feature has been omitted because the operation as well as the circuit of such tube are well known.

1.108 The last impulse series

The rotary switch DM steps one further step after the last impulse series is transmitted. The storage capacitor which is now connected does not carry a charge. This constitutes the criterion signifying the fact that all stored impulse series have been transmitted. (In case a ten-digit number has been stored, the wipers of the rotary switch will now be in engagement with the contacts "11" which have no capacitor connected thereto.) The relays P and P1 remain energized in the presence of the uncharged storage capacitor. Relays V, J and H (Fig. 2*a*) are disconnected by contact 61*p*.

The holding winding I of the relay U is shunted by the contacts 82*p*1 and 97*s*. Relay U (Fig. 2*b*) deenergizes with some delay.

1.109 Checking by means of signal receiver

Relay L*r* energizes responsive to deenergization of the relay U and during the deenergization interval of relay V2 in a circuit 1.109/1 from battery (Fig. 2*b*), L*r*I, 131*r*, 118*t*, 192–2, 98*v*2, 247*b*, 81*u*, 109, 73*c*1 (Fig. 2*c*) to ground.

Relay L*r* holds over its contact 991*r* (Fig. 2*b*) and connects at its contact 1001*r* the relay L*r*1 (Fig. 2*c*) over a circuit 1.109/2 from battery (Fig. 2*c*), L*r*1, 1001*r*, 59*e*, 140*r*1, 11*c* to ground.

Contact 1011*r* connects the relay L*r*2 and contact 1021*r*1 connects the relay L*r*3 (Fig. 2*c*).

The selection repeating device now checks whether the wanted selected subscriber is "busy" or "idle." This is accomplished by means of an associated signal receiver comprising the tubes R*o*1 and R*o*2. The signal receiver is connected to the outgoing line conductors over the contacts 1031*r*2 and 1041*r*2 of the relay L*r*2 in a circuit 1.109/3, extending from conductor 121 (Fig. 2*d*), 8*tv*, 120, 4*ut*, 252*up*, 1041*r*2, C*o*5, ÜlI, C*o*33, ÜlII, C*o*6, 1031*r*2, 251*up*, 3*ut*, 119, 7*tv* to conductor 122.

The resistor W*i*32 in parallel with the primary winding of the transformer Ü1 serves as a loop resistor.

The contact 1051*r*2 of the relay L*r*2 switches the control grid of the tube R*o*2 from impulse counting to signal checking.

The respective idle or busy signal is connected to the control grid of the tube R*o*1 through the repeater Ü1. The corresponding signals which are amplified by the tube R*o*1 are transmitted to a sound filter or discriminator, over the transformer Ü2, the filter comprising a parallel resonance circuit with an inductance L1 and the capacitor C*o*24 and a series resonance circuit with the inductance L2 and the capacitor C*o*27 as shown in Fig. 2*d*. The two resonance circuits are respectively tuned to the frequencies of the idle and busy tones. They may be adjusted by adjustment of the iron cores of the coils L1 and L2.

The two resonance circuits have a certain resonance width or band. When frequencies lying within this band reach the parallel resonance circuit, a voltage will result thereon. This voltage causes the germanium rectifier G111 to produce a certain negative potential on the capacitor C*o*30 which operates as a grid blocking potential on the control grid of the tube R*o*2. The resistance of the series resonance circuit is at such frequencies practically zero so that no voltage will occur thereon. Voltages will occur on the series resonance circuit only in the presence of frequencies which are outside of the tuned band. These voltages are rectified by the germanium rectifier C112; accordingly, a positive grid potential will occur on the capacitor C*o*31 and therewith on the control grid of the tube R*o*2.

The negative grid blocking potential blocks the tube R*o*2 and relay P accordingly deenergizes. The positive grid potential increases the plate current of the tube R*o*2 and thus secures the holding of the relay P.

1.110 Evaluation of the tone-signals.

The evaluation of the tone signals by the call separator comprising the relays Y. N, G, W and T (Fig. 2*b*) begins with the above described connection of the signal receiver (Fig. 2*d*) over the contacts 1031*r*2 and 1041*r*2. The relays Y, N and G were connected responsive to the first energization of relay C1 as described in the previously traced circuit 1.106/2.

The relay W has energized over contacts 106*n* and 107*g*. At its contact 108*w*, the relay W opens the energizing circuit of relay Y and at its contact 111*w* it closes for Y at the same time a holding circuit 1.110/1 from battery (Fig. 2*b*), W*i*33, 128*y*, 111*w*, 112*y*, YI, 109, 73*c*1 (Fig. 2*c*) to ground.

Relay P which deenergizes in step with the received idle or busy tone signals now controls the call separator. The rhythm or sequence of the busy tone signals is different from that of the idle or ringback tone. It is therefore sufficient to base the evaluation upon the busy tone which may for example consist of alternating tone intervals of 200 milliseconds and pauses of 400 milliseconds corresponding to the letter "*e*" of the Morse alphabet.

1.110.1 Called subscriber or trunk section busy

The busy tone is transmitted when the called line is busy and also when the trunk or line sections of the connection are busy. The holding winding of the relay Y is short circuited over the contacts 1091*r* and 110*p* upon first deenergization of the relay P and relay Y accordingly deenergizes. Relay T is now energized in a circuit 1.110.1/1 from battery (Fig. 2*b*), TI, 114*t*, W*i*34, 113*ü*, 112*y*, 110*p*, 1091*r*, 109, 73*c*1 (Fig. 2*c*) to ground.

The relay T remains energized in a holding circuit over its contact 115*t*. Its contact 116*t* interrupts the energizing circuit for the relays N and G. These two relays now are therefore dependent solely on relay P. More particularly, the relays N and G are held over their windings II in the deenergized and energized condition of relay P, respectively, the circuits to be considered being 1.110.1/2 extending from battery (Fig. 2*b*), NII, W*i*10, 111*w*, 110*p*, 1091*r*, 109, 73*c*1 (Fig.2*c*) to ground; and 1.110.1/3, from battery (Fig. 2*b*), GII, W*i*11, 117*w*, 110*p*, 1091*r*, 109, 73*c*1 (Fig.2*c*) to ground.

The capacitors C*o*22 and C*o*23 which jointly with the resistors W*i*10 and W*i*11 determine the respective deenergization intervals of the relays N and G prevent deenergization of these relays so long as the contact 110*p* is actuated in step with the busy tone signals. The deenergization interval of relay N may be adjusted by resistor W*i*10 and that of relay G by the resistor W*i*11.

Contact 118*t* upon opening interrupts the energization circuit of relay L*r*; however, this relay is held in its actuated position for about 3 to 4 sec. by the discharge of the capacitor C*o*8 over the contact 1191*r*1. Relay L*r*2 (Fig.2*c*) is disconnected upon deenergization of relay L*r*. The checking period is thereby concluded. Relay P1 continues to hold over the contacts 61*p* and 1201*r*2 (Fig. 2*a*).

Relay L*r*1 remains for the time being energized in a circuit 1.110.1/4 from battery (Fig. 2*c*), L*r*1, 283–3, 1211*r*1, 59*e*, 140*r*1, 11*c* to ground.

1.110.2 Faulty line

The signal receiver (Fig. 2*d*) does not receive any operating signals (busy or idle tone) if a switch reaches an "open" line or in the presence of switch failure, during the repeating of the selection of the desired line. Relay P therefore remains at rest. The relays Y, N, G and W remain actuated; relay T is not connected.

The relay D1 has connected the relays Z*e*1 and Z*e*2 upon initiation of the waiting operation, in circuits 1.110.2/1 from battery (Fig. 2*a*)

1.110.2/1 from battery (Fig. 2*a*) $\frac{Ze1II}{Co43}$, 123*ze*2, 125*d*1 to ground; and 1.110.2/2 from battery (Fig. 2*c*) **W*i*18, 285*d*, 17, Z*e*2** (Fig. 2*a*), **122*ze*1, 125*d*1** to ground.

The circuit of the relay **Z*e*1 is interrupted at contact 123*ze*2 and Z*e*1 thereupon deenergizes and interrupts the circuit for relay Z*e*2. The latter relay relay remains actuated for about 10 sec. by the discharge current of the capacitor C*o*35 over contact 124*ze*2** in a circuit 1.110.2/3 which extends from battery (Fig. 2*c*), **W*i*18, 285*d*, 17, Z*e*2** (Fig. 2*a*), **124*ze*2, W*i*30, C*o*35** to ground.

Relay **Z*e*2 deenergizes if the capacitor C*o*35 is discharged and reconnects the relay Z*e*1 at its contact 123*ze*2** whereupon the operations are repeated.

The first energization of relay **Z*e*1 remains without effect because its contact 126*ze*1 closes before contact 1271*r*3** (Fig. 2*a*). Upon second energization of the relay **Z*e*1, the relay H will be briefly connected by these contacts. Relay H controls the counting chain I to V, as in the selection repetition, in intervals determined by the release delay of the relay Z*e*2. Relay II accordingly energizes after about 20 sec. after initiation of the waiting operation and opens at its contact 192–2** the holding circuit of the relay L*r* (Fig. 2*b*). The latter deenergizes after about 3.5 sec. thus causing deenergization of the relay L*r*2 (Fig. 2*c*). The signal-checking period is thus limited to about 13 to 24 sec.

1.110.3 The called line is idle

The signal receiver will receive the idle or ringback tone signal if the called subscriber is idle. The relay P will switch in step with the corresponding signals and will interrupt the holding circuit for relay Y while connecting the relay T. The holding circuit for the relays N and G is opened by contact **116*t***.

The relay P now operates in a rhythm or sequence which is different from that caused by the busy tone and the charge of the capacitor C*o*22 does not suffice for the holding of the relay N or that of the capacitor C*o*23 does not suffice for the holding of the relay G (Fig. 2*b*). Either relay N or G will deenergize and open the circuit of relay W (Fig. 2*b*) at the respective contact **106*n* or 107*g***. The thermo relay T*h*1 is now switched in by contact **130*w*** of the relay W, in a circuit.

1.110.3/1 which extends from battery (Fig. 2*c*), T*h*1, R, **153*x*, 130*w*, 1101*r*, 73*c*1** to ground.

The circuit for relay L*r* (Fig. 2*b*) is opened at contact **131*r*** of relay R. The relays R and T*hi* remain connected over contact **132*r*** (Fig. 2*c*). The relay R1 (Fig. 2*c*) is connected by contact **133*r*. The outgoing loop remains closed since contact 135*r*1 bridges the time interval between the opening of contact 1361*r* and closure of contact 1371*r*1** (Fig. 2*c*). The contacts **138*r* and 139*r*** (Fig. 2*b*) place ringing current on the subscriber's loop. The calling subscriber is thus called and such calling persists until he removes his hand set, thereby completing a circuit 1.110.3/2 which may be traced from battery (Fig. 2*b*), W*i*17, 13, 14, **138*r***, XI, D*r*2I, **166*c*, 174*it*, 238*an*1, 101, 163*an*** (Fig. 2*a*), **264*x*1, 1*ut*, *a***, GU, WW, C*o*25, *b*, **2*ut*, 265*x*1, 164*m*, 102**, D*r*2II (Fig. 2*b*), **150*e*, 151*o*, 139*r*** to ground.

The relay X is not operated responsive to the transmission of ringing current.

Contact **140*r*1** disconnects the signal receiver and the relay L*r*1. Relays L*r*3, Ü, P and P1 (Fig. 2*c*) accordingly deenergize also. A special signal device may be connected at terminal 18 (central part of Fig. 2*c*), for example, a tape device or a tone generator which produces a particular signal. Such particular signal or an announcement recorded on a tape is thus placed on the winding III of the relay D*r*1 (Fig. 2*c*) over contact **141*r*1** and is inductively transmitted to the windings I and II of such relay which are disposed in the outgoing line loop as shown on top of Fig. 2*c*. The called subscriber who happens to have removed his hand set before the calling subscriber, receives in this manner a signal to inform him that he has been called by a waiting device and should hold the line until the calling party responds.

1.111 Release and re-seizure of the connection in case of busy condition

If the called line or a line or trunk section is found busy, relay **L*r* will deenergize as described and its contact 1011*r* will open the circuit for relay L*r*2** (Fig. 2*c*). Contact **1361*r* disconnects the relay D*r*1; the outgoing line loop remains closed over contact 142*c*1 of the relay C1, resistor W135 and contact 146*r*3**, until the relay C1 deenergizes (Fig. 2*c*). The terminals 19 are in this case connected together. Relay C1 releases with some delay after opening of the contact **143*r*2**.

Relay T, if already energized, will be held operated over contact **144*c*1 of relay C1**, and if not in operated condition, will be energized over this contact in a circuit 1.111/1 which may be traced from battery (Fig. 2*c*), TII, **144*c*1, 1211*r*1, 59*e*, 140*r*1, 11*c*** to ground.

Responsive to opening of contact **70*c*1, relay C2 deenergizes with great delay because of the discharge of the capacitor C*o*44. The deenergization interval is such as to secure with certainty release of the exchange connection devices during the opening interval of the contacts 142*c*1 and 145*c*2. After deenergization of relay C2, the outgoing line loop is immediately closed again over contacts 145*c*2, resistor W*i*36 and contact 1461*r*3**, and the preselector VW is thus again seized. It is therefore impossible to place a call during the selection repeating operation because re-seizure is effected immediately after release of the connection.

1.112 Spacing between succesive selections

The selection is repeated after the lapse of a predetermined interval in order to avoid overloading of the exchange equipment. The corresponding pause is determined by the counting chain I to V which is switched at intervals of about 10 to 12 sec. by the relays **Z*e*1 and Z*e*2** and the relay H. A contact of one of the relays I to V is disposed in the holding circuit of the relay L*r*1 (Fig. 2*c*) depending on the desired duration of the pause. It is assumed in the present example that the pause should amount to about 30 sec. Accordingly, the contact 283–3 of the relay III is disposed in the circuit referred to. This contact opens after about 30 sec. and disconnects the relay **L*r*1. After deenergization of the relay L*r*1**, the relay L*r*3 will deenergize with some delay. Relay T (Fig. 2*b*) remains operated over its contact **115*t* after deenergization of relay L*r*1. Contact 1471*r*1 reconnects the relay C1 and the latter switches in the relay C2 at its contact 70*c*1. Before the contact 1461*r*3 opens, the contacts 71*c*1 and 72*c*1 will be in actuated position, so that the outgoing line loop remains uninterruptedly closed. Relay D*r*1** energizes again.

1.113 Second and following repeated selection with correction of the capacitor discharge Contact **73*c*1 connects the relays Y, N, G and W again. Contact 1481*rt* simultaneously closes the circuit for relay S, since the relays P and P1 are still energized and contact 75*p*1 is consequently closed. The rotary switch DM can accordingly be stepped in its initial position only upon deenergization of the relay T. Contact 48*s*** opens the holding circuits of the counting relays I to V, F and K which deenergize without delay, and also opens the circuit for the winding I of relay T which deenergizes with delay.

The deenergization delay for the relay T is provided so as to cancel the charge of that storage capacitor which happened to be connected over the wipers *dm*I and *dm*II after repeating the selection operation. The charge of such capacitor was brought about by the utilization of the counting relays I to V for repeating the selection operation. These capacitor charges would cause transmission of a further digit in addition to the originally stored digits, incident to the successive repetition of the selection. Two further digits would be additionally transmitted incident to the next following repetition of the selection and the wipers *dm*I and *dm*II would finally connect a storage capacitor carrying a charge corresponding to one of the digits of the desired line and such capacitor charge would be falsified.

The falsified capacitor charge is cancelled after the contacts 40–1 to 44–5 of the counting relays I to V have returned to their normal positions. This is accomplished in the time interval between the deenergization of the last counting relay and the deenergization of the relay T over a circuit 1.113/1 which may be traced from 12 (Fig. 2*c*), over *Wi*28, 44–5, 43–4, 42–3, 41–2, 40–1, 47*s*, 119, *dm*I (Fig. 2*d*), *Co* . . . , *dm*II, 271*u*, Wi14, 118 to 12 in Fig. 2*c*.

Contact 149*t* now closes the energizing circuit for the rotary magnet DM of the rotary switch which steps it to the normal position in interplay with the relay S (Fig. 2*b*). The relay U energizes again in the normal position of the rotary switch. The next selection is repeated as described in the circuit traced in accordance with 1.107.

1.114 Waiting subscriber answers

When the desired wanted party is finally found idle, responsive to repeated selection operations, the selection repeating device will inform the calling subscriber by repeated revertive call in a circuit as traced under 1.110.3.

When the calling subscriber removes his hand set, the switch hook contacts GU will close the subscriber's loop. Relay X (Fig. 2*b*) will energize because its winding II is shunted by the contacts 150*e* and 151*o*. This signifies the conclusion of the selection repeating condition or operation. Contact 54*x* opens the holding circuit of the relays E, D and D1. Relay E deenergizes with some delay; the relays D and D1 remain however operated until such a time when contact 54*x* returns to normal (Fig. 2*c*).

Contact 153*x* opens the holding circuit of the relay R (Fig. 2*c*). The contacts 138*r* and 139*r* of relay R (Fig. 2*b*, circuit 1.110.3) disconnect the ringing current and connect the relay A in the subscriber's loop (Fig. 2*b*). Contact 133*r* disconnects the relay R1 which deenergizes with some delay and disconnects at its contact 141*r*1 the special signal means connected to terminal 18 (Fig. 2*c*). The relay E upon deenergizing opens its contact 150*e* and thereby frees the winding II of the relay X. Relay X and subsequently relays D and D1 deenergize. Relay C holds over contact 10*a* of the relay A (Fig. 2*c*). Relay C1 however deenergizes delayed because contact 68*d* has opened. At its contact 72*c*1 it connects the line conductors 106 and 114 through. Relay C2 is disconnected at contact 70*c*1. The outgoing line loop remains closed over the contacts 5*a* and 6*a*. The talking condition is thereby established. The thermo relay T*h*2 has been connected over contact 66*d* and has switched in the relay M (Fig. 2*b*) at its contact 52*th*2.

1.115 The calling party does not answer

If the calling party, that is, the party who initiated the call, does not answer within a certain time of say, for example, within 20 to 30 sec., the selection repeating device will automatically terminate the repeating condition and will release the connection. There is for this purpose the thermo relay T*h*1 provided in the circuit of the relay R (Fig. 2*c*). Relay T*h*1 shunts at the lapse of the corresponding time interval the winding II of the relay E by means of its contact 154*th*1. Relay E deenergizes and interrupts at its contact 63*e* the holding circuit of the relays C1 and D1 (Fig. 2*c*). The relays C1 and C2 accordingly release as traced in the circuit 1.114. The revertive call is terminated by the disconnection of relay R by means of the contact 73*c*1. The contacts 71*c*1 and 72*c*1 open the outgoing line loop and thereby cause the release of the corresponding connection or switching devices (Fig. 2*c*).

The selection repeating device is now restored to its normal condition. Contact 65*d* causes delayed release of the relay C (Fig. 2*c*). Relay C at its contact 155*c* connects relay S in a circuit 1.115/1 which may be traced from battery (Fig. 2*b*), SII, SI, 156*x*1, 78*dm*, 155*c*, 157*p*1, *dm*IV, 148*r*1 to ground.

The interplay between the relay S and the rotary magnet DM of the rotary switch causes stepping of the latter until its wiper *dm*IV is in home or normal position or on contact "I" whereby the circuit traced under 1.115/1 is interrupted. Contact 11*c* disconnects the voltage divider *Wi*1 to *Wi*7 (Fig. 2*c*).

1.116 Calls to public network

If the selection repeating robot device is used in a P. B. X, it may be desired to prevent outside calls to the public network. The latter is reached by dailing an exchange digit. In order to prevent outside calls, the relay M is immediately energized upon dialing the exchange digit. It shall be assumed that the exchange digit is "0." Upon dialing "0," the relay M is energized over the contacts 158–1 and 159–1 of the counting chain in a circuit 1.116/1 which extends from battery (Fig. 2*b*), MII, 159–5, 20–20, 158–1, 160*k*, *dm*IV, 1481*r*1 to ground.

The terminals 20 are in this case connected. If outside calls are not to be prevented these terminals are separated.

1.117 Completion of call and release

The calling subscriber replaces his receiver at the completion of the conversation and thereby interrupts the line loop. Relay A releases. Its contacts 5*a* and 6*a* open the outgoing loop and thereby initiate the release (Fig. 2*c*). Contact 10*a* causes slow release of the relay C (Fig. 2*c*) in the selection device. Contact 155*c* closes the circuit for relay S which steps the rotary switch to its home position by interplay with the rotary magnet DM. Relay M, if energized, is disconnected again by the contact 50*c* (Fig. 2*c*). The release is thereby completed and the waiting-selection device is again at normal.

1.200 Call with the hand set off-normal

The selection device which is controlled by the key set WT permits selection of frequently desired numbers. The key set comprises a number of keys T1 to T*n*. Each of these keys is assigned to a predetermined subscriber's line.

1.201 Initiation of selection by key operation

The switching operations responsive to removal of the hand set are the same as traced in circuit 1.101. If the subscriber depresses one of the keys T1 to T*n*, a corresponding marker relay Z1 to Z*n* will energize to start the operation of the selection apparatus. If it is assumed that the key T1 is actuated, there will result a circuit 1.201/1 which may be traced from battery (Fig. 2*a*), Z1, T1, 170*an*1, DT, *Sp*TII, 286*d*1 to ground.

Contact 287*c*1 connects the relay A*n* in parallel with relay Z1, and A*n* connects itself in a holding circuit over contact 162*an*. Contacts 163*an* and 164*an* of the relay A*n* open the subscriber's loop and connect the loop supervision relay A*n*2 which energizes in a circuit 1.201/2 from battery (Fig. 2*a*), A*n*2I, 163*an*, 264*x*1, 1*ut*, *a*, GU, *nsi*, MT, *b*, 2*ut*, 265*x*1, 164*an* to ground.

Contact 165*an* closes an alternate loop for the relay A in which the relay B will energize in a circuit 1.201/3 from battery (Fig. 2*b*), W*i*17, 269*ar*, AI, 138*r*, XI, D*r*2I, 166*c*, 174*it*, 165*an*, 239*b*, 240*an*1, BI, D*r*2II, XII, AII to ground.

Relay B, at its contact 167*b*, connects the auxiliary start relay A*n*1 in a circuit 1.201/4 from battery (Fig. 2*a*), A*n*1, $\frac{288an2}{284m}$, 167*b*, 286*d*1 to ground.

Contact 168*an*1 closes an alternate circuit for the relay A*n*2 (Fig. 2*c*). Contact 170*n*1 closes a holding circuit for the marker relay Z1 to Z*n* that happens to be connected, which is independent of the keys T1 to T*n*.

Relay A*n* remains energized until the key T1 is released in a circuit 1.201/5 which may be traced from battery (Fig. 2*a*), A*n*, 162*an*, T1, 287*z*1, 170*an*1, DT, S*p*TII, 286*d*1 to ground.

The effect of this operation is that the selection device transmits the keyed subscriber's number after the relay A*n* has deenergized after release of the corresponding key which had been depressed.

1.202 Automatic selection by the selection device

Relay A*n* connects at its contact 171*an* the impulse relay JT which transmits selection impulses as may be required, in a circuit 1.202/1 which may be traced from battery in Fig. 2*a*, $\frac{JTI}{JTII}$, $\frac{Co21}{Wi21, 281x}$, 173*it*, 218*g*, 172*dr*1, 171*an*, 167*b*, 286*d*1 to ground.

The resistor W*i*21 serves for adjusting the required impulse pauses; the impulse length or duration is regulated by means of the resistor W*i*22.

The selection repeating device is now controlled by the contact 174*it* (Fig. 2*b*) of the relay JT in the same manner as it is otherwise controlled by the dial impulse contact *nsi* of the station S*t*. As described under 1.102 and 1.103, the selection impulses are translated by the relay A and transmitted to the selection devices in the exchange over the outgoing line loop and are at the same time stored in the selection repeating device.

Relay B which would deenergize due to the interruptions of the loop by contact 174*it* is held during the impulsing over its winding II (Fig. 2*a*) in a circuit including contact 175*it*.

The marker relays Z1 to Z*n* are as above described held, each over its own working contact. The remaining working contacts of each marker relay form a contact field whose outlet terminals are designated in Fig. 2*a* by I to IX. The contact fields of all marker relays are multiplied, as indicated in Fig. 2*a*, and are connected with identical outlet terminals. Details are shown only with respect to the contacts $z1_1$ to $z1_8$ of the relay Z1. The individual contacts are connected with a further contact field comprising contacts of the relays S1 to S4 and SK. These relays form together with relay SF a counting chain which serves for counting the individual selection impulse series. A further contact field is formed by contacts of the relays M1 to M5 and MK. These relays together with relay MF form another counting chain serving for the counting of the individual selection impulses. The outlet terminals of the latter chain are indicated in Fig. 2*a* by numerals 1 to 10.

The outlet terminals I to IX and 1 to 10 are interconnected by wiring in accordance with the desired station number. In order to facilitate the understanding of the switching operations, it shall be assumed that the key T1 or rather to say the marker relay Z1 which depends on this key, corresponds to the subscriber's number 83633. The wiring scheme for the outlet terminals of the contact fields is apparent from the following table:

| No. 83633 | Terminal Wiring |
|---|---|
| 8 | 8–I |
| 3 | 3–II |
| 6 | 6–III |
| 3 | 3–IV |
| 3 | 3–V |
| Release | IX–VI |

The outlet terminals for the keys T2 to T*n* are similarly interconnected in accordance with the subscribers' numbers respectively served thereby. The subscribers' numbers can have a maximum of eight digits in accordance with the outlet terminals I to VIII. The terminal IX serves for completing a circuit in which the relay B is affected when the selection is concluded.

The impulse counting chain comprising the relays M1 to M5, MF and MK (Fig. 2*a*) is stepped by contact 176*it* by the discharges of the capacitor C*o*38 in the same manner as the previously described counting chain comprising the relays I to V, F and K (Fig. 2*b*) was stepped by discharges of the capacitor C*o*7 in circuits respectively including the contacts 18*a* and 93*h*.

In the assumed example, the first digit "8" produces a series of eight impulses. As soon as the impulse counting chain has counted these impulses, the relay Q energizes in a circuit 1.202/2 which extends from battery (Fig. 2*a*), Q, 207*mk*, 198*m*1, 200*m*2, 202*m*3, 8–I, $z1_1$, 208*s*4, 210*s*3, 212*s*2, 214*s*1, 216*sk* to ground.

At contact 218*q*, the relay Q disconnects the impulse relay JT (Fig. 2*a*). Contact 219*q* opens the holding circuit of the counting relays M1 to M5, MF and MK. The energizing circuit for the relay Q traced under 1.202/2 is interrupted again as soon as the contacts of these relays (M1 to M5, MF and K) are in their resting positions. Relay Q releases with strong delay due to the booster effect of the capacitor C*o*42 over the contact 279*q*; its release time amounts to about 1000 milliseconds and represents the pause between the individual selection impulse series.

Contact 220*q* steps the counting chain comprising the relays S1 to S4, SF and FK by one further step by the discharge of the capacitor C*o*37. The operations in the stepping of this counting chain are similar to those described in connection with the counting chain comprising the relays I to V, F and K. Instead of the wiring bridge 8–I, the bridge 3–II will now be effective over the contacts 216*sk*, 214*s*1 and $z1_2$.

Upon release, the relay Q reconnects the impulse relay JT at its contact 218*q*. Relay JT transmits the next impulse series comprising three impulses and controls at the same time, by its contact 176*it*, the impulse counting chain until relay Q is actuated again, responsive to the third impulse, in a circuit 1.202/3 which may be traced from battery (Fig. 2*a*), Q, 207*mk*, 197*m*1, 199*m*2, 201*m*3, 3–II, $z1_2$, 214*s*1, 216*sk* to ground.

The above described operations are analogously repeated for the remaining digits 6–3–3. The relay Q is accordingly actuated at the conclusion of each of the three remaining digits 6–3–3, in the circuits 1.202/4 from battery (Fig. 2*a*), Q, 207*mk*, 198*m*1, 6–III, $z1_3$, 212*s*2, 214*s*1, 216*sk* to ground;

1.202/5 from battery (Fig. 2*a*), Q, 207*mk*, 197*m*1, 199*m*2, 201*m*3, 3–IV, $z1_4$, 210*s*3, 212*s*2, 214*s*1, 216*sk* to ground; and 1.202/6 from battery (Fig. 2*a*), Q, 207*mk*, 197*m*1, 199*m*2, 201*m*3, 3–V, $z1_5$, 208*s*4, 210*s*3, 212*r*2, 214*s*1, 216*sk* to ground.

1.203 Conclusion of selection

The selection device is disconnected at the conclusion of the last selection impulse series. Relay Q switches the counting chain comprising the relays S1 to S4, SF and SK to the next position in which the relay B is released by opposing energization of its winding II. In the assumed example, the outlet VI corresponds to this stepping position, such outlet being interconnected (wired) with the outlet IX. Winding III of relay B is placed in the circuit 1.203/1 extending from battery (Fig. 2*a*), BIII, **217*b*, IX–VI, $z1_6$, 215*s*1, 216*sk*** to ground.

The special release wiring is not required in the case of subscribers' stations having numbers with the maximum number of digits, in the assumed example eight digits, because in such cases contact **209*s*4** of the counting relay S4 will place winding III of relay B in a circuit 1.203/2 from battery (Fig. 2*a*), BIII, **217*b*, 209*s*4, 211*s*3, 213*s*2, 215*s*1, 216*sk*** to ground.

The loop for relay A remains closed after release of relay B in the circuit 1.203/3 from battery (Fig. 2*b*), W*i*17, **269*ar*, AI, 138*r***, XI, D*r*2I, **166*c*, 174*it*, 238*an*1, 239*b*, 240*an*1**, W*i*12, **241*an*2**, D*r*2II, XII, AII to ground.

Contact **167*b*** of the relay B interrupts the holding circuits for the counting relays M1 to M5, MF and MK and also for S1 to S4, SF and SK, and in addition the circuits of the relays JT and A*n*1 (Fig. 2*a*). Relay A*n*1 releases with delay and at its contact **168*an*1** disconnects the relay *An*2 (Fig. 2*c*).

The contacts **238*an*1 and 240*an*1** interrupt the circuit traced under 1.203/3 and switch the line conductors through to the station S*t*. The selection repeating robot device thus has translated and transmitted the selection impulses exactly as in the case of the dialed impulses and has stored the desired number in the selection repeating device.

The calling subscriber now listens for the ringback tone or, as the case may be, for the busy tone. In the latter case, he can initiate the waiting condition by depressing the grounding key ET. The subsequent switching operations correspond to those described under 1.105 to 1.117.

1.300 Selection device selects with replaced hand set

The foregoing explanations dealt with broadly known functions of the selection device. The following explanations will deal with switching operations which take place in the circuit arrangement according to the invention, namely, when the selection and the selection repeating device are set to function in response to a single switching operation performed by the subscriber. As has been initially said, this switching operation consists in merely depressing one of the keys T1 to T*n* of the key set WT which corresponds to the desired number.

The subscriber, with the hand set replaced, cannot check by listening for the dial tone whether he has been connected with an idle trunk and particularly with an idle first selector, and such checking therefore must be done by the selection repeating device.

The line conductors are for this purpose crossed in outgoing and in incoming direction in the preselector and in the subscriber circuit, respectively. As shown in Fig. 2*d*, the outgoing line conductors connected to the working sides of the two switching contacts **7*tv* and 8*tv*** which disconnect the subscriber's line from the start and switch it through to the group selector GW, are exchanged. The line conductors for the incoming calls coming from the connectors LW are similarly crossed.

Such exchange or crossing effects, after the switching through of the line conductors in incoming and outgoing calls, connection of plus potential to the line conductor 112 and minus potential to the line conductor 114 (Fig. 2*c*). If the preselector in the case of outgoing calls does not find an idle group selector GW, the start circuit condition remains and the potentials on the line conductors remain unaltered. The exchange of the potentials upon switching through of the line conductors to the group selector GW (Fig. 2*d*) is supervised by the relay D*r*1 in conjunction with the rectifier G113 (Fig. 2*c*). The terminals 27 are in such case connected together; the terminals 28 and 29 are not connected (Fig. 2*c*).

1.301 Initiation of selection by key depression

When the subscriber depresses one of the keys T1 to T*n* of his key set without removing the receiver or hand set, the selection repeating device will operate to seize an idle connection device in the exchange. The operations incident to the initiation of the selection and the subsequent automatic selection by the selection device are similar to those already described under 1.201 to 1.203.

1.301.1 Siezure of an idle selection device

Relay Z1 is actuated responsive to depression of a key such as T1 and at its contact **287*z*1** such relay connects the relay A*n* (Fig. 2*a*). Contact **165*an*** is accordingly closed and connects the relay B in the loop circuit of relay A (Fig. 2*b*). Relays A and B energize.

The contacts **5*a* and 6*a*** of the relay A connect the relay D*r*1 to the outgoing line conductors 112 and 114. Contact **242*an*** connects the rectifier G113 in parallel to relay D*r*1 responsive to the depression of the key; contact **243*b*** of relay B thereupon takes care of connecting the rectifier.

The rectifier G113 is polarized so that it shunts the relay D*r*1 so long as there is minus potential on the line conductor 112 and plus potential on the conductor 114. The relay D*r*1 therefore can energize only when the preselector VW has found an idle group selector, that is, responsive to the exchange of the potentials upon switching through of the line conductors, because the rectifier G113 is then in blocking direction in the outgoing line loop and the shunt for relay D*r*1 does not exist.

Relay D*r*1 energizes and at its contact **172*dr*1** connects the relay JT (Fig. 2*a*). The selection by the selection device now takes place as described under 1.201 to 1.203.

Contact **244*dr*1 disconnects the rectifier. At its contact 245*dr*1** the relay D*r*1 connects the relay C1 in a circuit 1.301/1/1 from battery (Fig. 2*c*), **69*o*, 245*dr*1, 246*an*1, 1471*r*1, 275*an*2, 11*c*** to ground.

The circuits described under 1.106 now become operative and the call separator is thereby prepared for operation.

The transmission of the impulses to the outgoing line loop is effected by contact **6*a*** of the relay A.

The selected number is stored as explained under 1.103. Relay B releases after the last impulse series as noted under 1.203. It opens the loop to the relay A (Fig. 2*b*) at its contact **239*b*. Relay A continues to hold over contact 241*an*2**. Relay X is at the same time connected in a circuit 1.301.1/2 extending from battery (Fig. 2*b*), W*i*17, **269*ar*, AI, 138*r***, XI, D*r*2I, **166*c*, 174*it*, 238*an*1, 239*b*, 240*an*1**, W*i*12, **241*an*2, 107, 50*c*** (Fig. 2*c*) to ground.

The arrangement according to the invention therefore is such that the grounding responsive to depression of key ET by which the subscriber has otherwise started the functioning of the selection repeating device, is automatically simulated. Relay X is energized only until release of the relay A*n*1 which is disconnected at the contact **167*b*** of relay B. The switching operations are similar to those described under 1.105. The energization of relay C1 prior to initiation of the selection repeating condition by relay X results in starting the checking period for the signal receiver, and not the selection repetition as described under 1.105 to 1.107.

Relay L*r* is connected (Fig. 2*b*) over the closed contact **98*v*2 and the closed contact 247*b***. The checking and evaluation of the incoming busy tone and operating signals to the completion of the call takes place as explained under 1.109 to 1.117.

1.301.2 All selection devices busy

The starting operations are similar to those described under 1.301.1. However, the potentials on the line conductors remain, that is, plus potential remains on the line conductor 114 and minus potential remains on the line conductor 112, since the preselector has not switched through to effect the potential exchange. The rectifier G113 prevents energization of the relay D*r*1 by shunting it. Accordingly, relay JT is not connected. The thermo relay T*h*3 is however heated and finally energizes in a circuit 1.301.2/1 which may be traced from battery (Fig. 2*a*), W*i*39, T*h*3, 172*dr*1, 171*an*, 167*b*, 286*d*1 to ground.

Relay T*h*3 closes its contact 248*th*3 and thereby connects the poling relay U*p* in a circuit 1.301.2/2 from battery (Fig. 2c), U*p*I, 248*th*3, 11*c* to ground.

Relay U*p* closes a holding circuit for its winding II (Fig. 2*c*) at its contact 249*up*. It closes at the same time its contact 350*up*, thereby short circuiting the outgoing line loop and thus causing the preselector (Fig. 2*d*) to remain in the assumed busy position. The terminals 25 and 26 are in such case connected together. The contacts 251*up* and 252*up* respectively place plus potential on the line conductor 112 and minus potential on the line conductor 114 in a circuit 1.301.2/3 extending from battery (Fig. 2*c*), 113, W*i*40 (Fig. 2*d*), 24–24, 252*up*, 114, 90*i* (Fig. 2*c*), 6*a*, 64*d*, *dr*1II, 71*c*1, 1371*r*1, 112, 251*up* (Fig. 2*d*), 23–23 to ground.

The same polarity switching of the line conductors is thus obtained as incident to reaching an idle connecting device. The relay D*r*1 now energizes in the circuit traced under 1.301.2/3. Its contact 172*dr*1 disconnects the relay T*h*3 connecting instead the relay JT which starts to pulse.

The further switching operations are similar to those described under 1.301 and 1.301.1 and 1.105 to 1.117. The impulsing by contact 6*a* of the relay A in the circuit 1.301.2/3 is in this case without effect.

The selection by the selecting device, with replaced receiver, can be prevented by actuating the rotary key DT. This feature prevents unintentional selection by accidental actuation of the keys T1 to T*n*. However, the selection, with the selection device, independent of the key DT is possible responsive to removal of the receiver or hand set, because the contact 253*c* which is in parallel with the key connects ground to the key T1 to T*n* (see circuits 1.201 to 1.203).

1.302 Systems prohibiting changing polarity of line conductors

The supervision of the seizure of an idle switching device by the selection repeating robot apparatus, as described in section 1.301, is impossible in systems in which the line conductors cannot be crossed or exchanged for inherent reasons, that is, in systems which require that the potentials on the line conductors remain unaltered. The connections for the terminals 23, 24, 25, 26 (Fig. 2*d*) and 27 (Fig. 2*c*) are in such cases omitted in the selection repeating robot apparatus and the terminals 21 and 22 (Fig. 2*d*) as well as 28 and 29 (Fig. 2*c*) are instead connected together. The contact 350*up* of the polarity switching relay U*p* which was previously connected over the terminals 25 and 26 (Fig. 2*d*) is now connected over the terminals 28 and 29 (Fig. 2*c*).

The relay D*r*1 (Fig. 2*c*) does not energize incident to selection operations initiated by a key because it is shunted by the rectifier G113. The thermo relay T*h*3 (lower right in Fig. 2*a*) operates after the lapse of a certain interval, for example, after about 2 to 3 sec. At its contact 248*th*3, relay T*h*3 connects the relay U*p* (lower left of Fig. 2*c*) and the latter closes at contact 249*up* a holding circuit for itself over its winding II which persists for the duration of energization of relay C1 which has connected ground to conductor 109 at its contact 73*c*1. Contact 250*up* disconnects the rectifier G113, thereby removing the shunt from the relay D*r*1 (Fig. 2*c*). The relay D*r*1 thereupon energizes and starts the operation of the impulse relay JT (lower right of Fig. 2*a*) by actuating its contact 172*dr*1. The holding winding III of the relay D*r*1 holds the relay D*r*1 in actuated position as already described.

The energization interval of the relay T*h*3 is of sufficient duration so as to give the preselector in the exchange time to hunt for an idle trunk. The delayed actuation of relay T*h*3 is necessary because the selection device might otherwise, responsive to brief actuation of a key, start with the selection operation before the preselector has switched the line conductors through to an idle switching device.

The seizure of an idle switching device or group selector may also be supervised by the selection device by immediately switching in the signal receiver for the evaluation of operating signals, responsive to actuation of one of the keys T1 to T*n* to initiate selection, and thereby making the selection apparatus dependent on the signal receiver. As soon as the line conductors are switched through to an idle selector, the selection repeating apparatus will then in known manner receive the dial tone which is thereupon evaluated by the signal receiver to cause the latter to free the selection apparatus for the selection of the desired called number whereupon the signal receiver disconnects itself from the line or talking conductors until the selection operations are completed.

1.400 Incoming calls

An incoming call can only be processed when the preselector or subscriber circuit, respectively, is in the exchange in series connection.

1.401 Incoming call with the selection repeating robot apparatus at normal

Ringing current from the connector LW actuates the relay A*r* (Fig. 2*c*) which is connected to the line conductors over the contact 9*dr* and the rectifier G114, in a circuit 1.401/1 from the connector LW (Fig. 2*d*), conductor 120, 3*ut*, 251*up*, conductor 112 to Fig. 2*c*, 9*dr*1, C*o*4, G114, A*r*, conductor 114 to Fig. 2*d*, 252*up*, 4*ut*, conductor 121 to the connector LW.

Relay A*r* (Fig. 2*c*) closes its contact 269*ar* (top left in Fig. 2*b*) thereby connecting the local ringing current source connected to terminal 14 (Fig. 2*b*) of the selection repeating apparatus to the line conductors extending to the station S*t*. Contact 254*ar* at the same time shunts the winding II of the relay A. The ring is transmitted over the circuit 1.401/2 from terminal 14 (top of Fig. 2*b*) of the ringing current source (bottom of Fig. 2*c*), closed contact 269*ar*, AI, XI, D*r*2I, *dm*III, 174*it*, 238*an*1, line conductor 101 to Fig. 2*a*, 163*an*, 264*x*1, 1*ut*, conductor *a*, GU, WW, C*o*25, conductor *b*, 2*ut*, 265*x*1, 164*an*, conductor 102 to Fig. 2*b*, D*r*II, XII, 254*ar* to ground.

Contacts 255*ar* and 256*ar* (top of Fig. 2*c*) open the outgoing line conductors in order to prevent transmission of the local ringing current in outgoing direction. Contact 257*ar* at the same time connects the relay Z*e*2 which has a release delay in excess of 10 sec. due to discharge from the capacitor C*o*35.

Relay Z*e*2 upon energizing closes at contact 258*ze*2 a circuit extending over contact 159*ar* for energizing relay M (Fig. 2*c*) and the latter closes at contact 260*m*, a holding circuit for itself. Relay A*r* thus causes ringing at the station S*t* in step with the incoming rings. Relay Z*e*2 remains operated during the pauses between ringing.

If the called subscriber S*t* answers during a ringing interval, the circuit 1.401/2 will be affected over the line loop and relay A (Fig. 2*b*) will energize over its winding I. If the call is answered during a ringing pause (with Ar deenergized) relay A will energize over its windings I and II. The switching operations correspond to those described under 1.101. The talking condition is thus established. The contacts 5*a* and 6*a* (Fig. 2*c*) switch the line or talking conductors through. The ringing current in the connector (a known and suitable connector being assumed) is in known and customary manner disconnected. Relay A*r* deenergizes and at its contact 257*ar* disconnects the relay Z*e*2 which however remains operated for an interval of about 10 sec. Relay M remains operated over its winding I (top of Fig. 2*b*) in a circuit over its own contact 50*m*, conductor 107 to Fig. 2*c* and meanwhile actuated contact 50*c* to ground.

1.402 Incoming call effected with selection repeating robot in operation

An incoming call was not possible under the conditions described in section 1.111 because the outgoing line loop was upon release immediately reclosed.

If it is desired that there should be a possibility for effecting incoming calls in the operating condition of the selection repeating apparatus, the connection over the terminals 19 (top right of Fig. 2*c*) will be removed. The effect is that the outgoing line loop is opened at contact 1361*r* of the relay L*r* responsive to deenergization thereof at the conclusion of the checking interval of the signal receiver. The reseizure over contact 1371*r*1 takes place upon deenergization of the relay L*r*1 at the expiration of the pause provided for the start of the next successive repetition of the selection operations. See in this connection section 1.112.

The incoming call can now be effected in the pause between the release of a built up outgoing call and reseizure of the group selector to repeat such outgoing call. The switching operations correspond to those described under 1.401 with the difference that the relay M opens the holding circuits for the relays D1, D and E (Fig. 2*c*) at its contact 260*m*. The corresponding relays restore. The selection repeating condition is thus cancelled and the selection repeating robot apparatus returns to normal except for the relays Z*e*2 and M which remain energized.

1.500 Functions of the grounding key ET

As already repeatedy described, the selection repeating condition is initiated by the actuation of the grounding key ET. This key may also be used for effecting desired switching operations in other phases of the building up of calls or, if the selecting repeating apparatus is used in a P. B. X, to effect connection with the operator.

If the subscriber has dialed a number and desires to interrupt the selection before completion thereof, he replaces the receiver so as to release the selection repeating apparatus. Relay A accordingly restores and disconnects the relay C. The contact 155*c* of relay C connects the relay S and the latter coacts in interplay with the rotary magnet of the switch DM so as to cause the latter to assume its home position. The further switching operations correspond to those described under 1.115. The selection repeating apparatus is thereby released.

1.501 Cancellation of the selection operations

If the subscriber has initiated selection by the selection apparatus by actuation of a key T1 to T*n*, either with his receiver or hand set removed or restored, actuation of the grounding key ET will effect release provided that the selection has not been completed. As described under 1.201, the subscriber loop is locally closed over the relay B while the line or talking conductor 101 is opened in the direction to the subscriber's station. Actuation of the grounding key ET connects ground to the line conductor 102. The differential relay X is thereupon energized.

Contact 54*x* (Fig. 2*c*) would now normally initiate the selection repeating condition. However, the relay C (Fig. 2*c*) will now be shunted by contact 261*x* in coaction with contact 168*an*1 of the still actuated relay A*n*1 and relay C will accordingly release, thereby preventing initiation of the selection.

Contact 166*c* opens the holding circuit of the relay B because the switch wiper *dm*III (top of Fig. 2*b*) has meantime left its home position. The consequent release of relay B restores the selection apparatus. The grounding key supervising relay X1 is now energized over contact 262*c* while relay A*n*1 is still energized and after relay C has restored, the energizing of relay X1 is being effected in a circuit 1.501/1 from battery in Fig. 2*c*, W*i*18, 262*c*, 30, X1I, 263*r*1, 168*an*1 to ground.

Contact 264*x*1 opens the line conductor 101. The line conductor 102 is opened by contact 265*x*1 (Fig. 2*a*). Relay X1 remains energized during the actuation of the grounding key over its winding II (Fig. 2*a*).

Relay S is actuated over contact 156*x*1 as soon as relay XI restores, and causes rotation of the switch DM into its home position by interplay with the corresponding rotary magnet.

1.502 Cancellation of the selection repeating condition

If the selection repeating apparatus has been switched to assume the repeating condition (see sections 1.105, 1.203 and 1.301.1), the subscriber can cancel such condition at any time by actuating the grounding key ET. Relay D1 is energized in the repeating condition and the actuation of the key ET accordingly effects over contact 266*d*1 closure of the subscriber's loop and at the same time grounding thereof. Relays A and X thereupon energize over their windings I in a circuit 1.502/1 from battery (Fig. 2*b*), W*i*17, 269*ar*, AI, 138*r*, XI, D*r*2I, 166*c*, 174*it*, 238*an*1, 101, 163*an*, 264*x*1, 1*ut*, 266*d*1, ET to ground.

Contact 54*x* of relay X opens the holding circuit of the relays E, D and D1 (Fig. 2*c*). The repeating condition is thereby cancelled. The switching operations correspond to those described in section 1.114. Relays X and A restore upon release of the key ET. Relay C is accordingly also restored. The selection repeating apparatus assumes its normal position. The outgoing line loop is opened. The apparatus is again in condition for reoperation.

1.503 Calling back

In P. B. X exchanges which provide for calling back during outside calls, such calling back is likewise initiated by actuating the grounding key ET.

After the subscriber has completed the selection (section 1.104) or after he has responded to (revertive) call and removed his receiver, the thermo relay T*h*2 will be actuated and will cause energization of relay M. Relay M is also actuated (section 1.116) in the case when selection repetition is prevented responsive to an outside exchange digit. Relay M is further actuated in case of an incoming call (sections 1.401 and 1.402).

In all cases when relay M is actuated and connected in a holding circuit, ground will be connected over contacts 50*c*, 54*x* and 161*m* to the line conductors 112 and 114 (Fig. 2*c*) over the windings I and II of relay D*r*1, upon actuation of relay X responsive to depression of the key ET, and the calling back is thereby in known manner initiated. The subscriber can thereafter select another P. B. X line by dialing or if desired by using the selection apparatus.

1.600 Trouble conditions 1.601 Blowing of fuses

If a fuse such as S*i* (bottom right of Fig. 2*b*) blows, the signal relay SR will operate and will connect itself in a holding circuit over its contact 267*sr* until it can restore again responsive to replacement of the fuse. Relay SR actuates in known manner known acoustical and/or optical alarm signals.

1.602 Operation with faulty power supply

If the selection repeating robot apparatus is in working order, the relay UT (bottom of Fig. 2*c*) will receive current from the current supply *St*V1 and its contacts will accordingly be in actuated positions. The fuse supervision relay SR (Fig. 2*b*), upon operating opens its contact 268*sr* and thus interrupts the circuit for relay UT which deenergizes. The contacts 1*ut* and 2*ut* (Fig. 2*a*) and also 3*ut* and 4*ut* (Fig. 2*d*) open and disconnect the selection repeating apparatus from the line conductors. The subscriber's station *St* is now directly connected with the exchange over the contacts 1*ut* and 2*ut* and terminals 31 and 32 (Fig. 2*a*) which are of course interconnected with corresponding terminals 31 and 32 shown in Fig. 2*d*.

1.603 Operation with blocked selection repeating apparatus

If trouble develops in the selection repeating robot apparatus, it will be disconnected by actuating the disconnect or blocking key *Sp*T. Contact *Sp*TII shown at the lower left of Fig. 2*a* disconnects the selection apparatus and contact *Sp*TI shown at the bottom of Fig. 2*c* disconnects the relay UT. The station *St* is now again connected directly with the exchange as described in section 1.602.

The selection and the selection repeating apparatus are separated in the embodiment shown schematically in Fig. 3. The selection apparatus WA is located as before at the associated subscriber. The standard telephone set *St* and the key set WT are connected with the selection apparatus WA as before, over a terminal box BK. The selection repeating apparatus WE is however disposed in the exchange. It is associated with a first group selector and is accessible with such selector to the preselection stage VW.

The advantage of this arrangement is that it requires less expenditure for the equipment at the subscriber station and that the selection repeating device WE is better utilized because it is available to a group of subscribers.

The key set WT of Fig. 3 comprises a so-called error-key JRR in addition to the selection keys T1 to T*n*, the grounding key ET and the lamp WL.

The operation of the various switching means will be explained with reference to Figs. 4/4*a* and 5*a*/5*b*/5*c*. Figs. 4 and 4*a* show details of the selection apparatus WA (Fig. 3) and Figs. 5*a* to 5*c* which should be arranged side by side with identically marked conductors in alignment show details of the selection repeating apparatus WE indicated in Fig. 3.

Referring now to Fig. 4, the subscriber station *St* and keys of the corresponding key set WT are shown at the left lower corner. The selection apparatus associated with the subscriber's station has its own local power supply *St*V2 shown at the upper right of Fig. 4. This power supply receives current from the commercial source WN and delivers at the terminal 51 direct current at, for example, −60 v. with reference to the grounded terminal BE. It will be recalled that a similar local power supply is provided in the embodiment described before. The line or talking conductors 151 and 152 as well as the private conductor 153 (bottom of Fig. 4) extend to the preselector VW in the public exchange (top left of Fig. 5*a*) and are switched through at such exchange to the waiting apparatus shown in Figs. 5*a* to 5*c*.

2.100 Selection with removed receiver

The following explanations are primarily concerned with calls in which the selection is effected by the use of the selection apparatus. Calls extended with the use of the dial effect in the selection repeating apparatus the same hereinafter explained switching operations and a separate description thereof can therefore be omitted.

2.101 Seizure

The switch hook contacts GU of the station *St* (bottom left of Fig. 4) close the subscriber's loop responsive to the removal of the hand set or receiver by the subscriber who wishes to make a call. The preselector VW in the exchange (see also top left of Fig. 5*a*) is thereby started and operates in known manner to seize an idle group selector. As in the previously described embodiment, the preselector may be of known structure and operation and the same applies to the group selector. These known devices have therefore been shown only schematically.

The selection repeating apparatus associated with the group selector is seized with it. The seizure of the group selector (and associated selection repeating robot device) is effected over the private conductor, and associated contacts and relays, which extend through the waiting device, the corresponding seizure circuit 2.101/1 extending from conductor 154 in Fig. 5*a*, preselector switch wiper VW*c*, key *Sp*T, wiper *dm*III, 380*m*, 361*a*, 362*d*, private conductor 159 to Fig. 5*b*, ZII, 363*d*, ZI, conductor 168 to the group selector GW.

The relay Z does not energize in the above traced circuit because its corresponding windings I and II are of low resistance.

After the line conductors are switched through by the preselector VW, the line relay A (Fig. 5*a*) of the selection repeating apparatus will energize in a circuit 2.101/2 from battery, AI, 138*r*, XI, D*r*2I, 381*m*, preselector wiper VW*a*, conductor 151 to Fig. 4 (left lower part), 317*it*, 314*c*3, conductor *a*, switch hook contacts GU, dial contacts *nsi*, MT, conductor *b*, 315*c*3, conductor 152 to left top of Fig. 5*a*, preselector wiper VW*b*, 382*m*, D*r*2II, XII, AII to ground.

The differential relay X does not operate in this circuit. The contacts 5*a* and 6*a* (Fig. 5*b*) of the relay A (Fig. 5*a*) close the loop to the group selector in a circuit 2.101/3 extending from conductor 164 of the group selector GW (Fig. 5*c*) to Fig. 5*b*, 90*i*, 1371*r*1, 5*a*, 370*c*1, D*r*1II, D*r*1I, 64*d*, 6*a*, and conductor 167 to the group selector in Fig. 5*c*.

The conductor 361*a* (Fig. 5*a*) of relay A opens, removing the shunt around relay C disposed in the private conductor of the seizure circuit from the preselector VW to the group selector GW, and relay C consequently energizes.

The seizure of the group selector and associated selection repeating apparatus is now completed. The subscriber listens to the dial tone which is in known manner inductively transmitted from the group selector.

2.102 Number selection

The construction and operation of the selection apparatus are in the salient points the same as described in section 1.200. The actuation of one of the keys T1 to T*n* causes operation of the corresponding marker relay Z1 to Z*n* in series with the start relay A*n* (Fig. 4) and the selection apparatus is thereby started. Assuming that key T1 has been depressed, there will result a circuit 2.102/1 from battery (Fig. 4), Z1, T1, 311*h*1, A*n*II to ground.

Contact 287*z*1 connects the relay H1 in parallel with relay Z1. Contact 301*an* connects the relay C3. Contact 310*c*3 shunts the winding II of relay A*n*. A holding circuit for winding I of relay A*n* is however at the same time closed in which this relay remains operated for the duration of the actuation of the key, the corresponding circuit 2.102/2 extending from battery, A*n*I, 313*an*, 312*c*3, T1, 287*z*1, 344*h*1, 316*c*3, 310*c*3 to ground.

The contacts 314*c*3 and 315*c*3 (Fig. 4) disconnect the station *St* from the line conductors 151 and 152. The outgoing loop is closed over contact 314*c*3. Relay C5 is actuated in a circuit 2.102/3 from battery, W*i*51, 302*an*, 306*c*4, C5, JRR to ground.

Relay C4 thereupon energizes in a circuit 2.102/4 which extends from battery C4I, 305$c5$, 304$an$, JRR to ground.

Relay C4 completes for its winding II a holding circuit 2.102/5 which may be traced from battery, C4II, 309$h1$, 308$c4$, $a$, GU, $nsi$, MT, $b$, 356$c4$, JRR to ground.

Relay C5 is shunted and releases in a circuit 2.102/6 extending from ground, JRR, C5, 306$c4$, 307$c5$, W$i$52, $a$, GU, $nsi$, MT, $b$, 356$c4$, JT to ground.

Relay A$n$ releases upon release of the actuated key. The relays Z1 and H1 remain energized. Contact 350$c4$ of the relay C4 has connected the relay C3.

The relay A$n$, upon releasing, connects at its contact the relay JT (top of Fig. 4) in a circuit 2.102/7 extending from battery, $\frac{\text{JTI}}{\text{JTII}}, \frac{\text{Co21}}{\text{W}i21}$, 173$it$, 330$q$, 171$an$ $\frac{332q}{334h1}$, 52–52, 316$c3$, 310$c3$ to ground.

Relay JT operates as explained in section 1.102. Its contact 317$it$ interrupts the outgoing line loop in successive impulses. The number of impulses transmitted is controlled by the counting chain comprising the relays M1 to M5 and MK. This chain is stepped by discharges of the capacitor Co38 over the contact 176$it$ in a circuit similar to the one described in section 1.202.

Relay Q energizes after transmission of each impulse series. It shall again be assumed that the key T1 has been depressed and that the marker relay Z1 depending on such key has actuated. This marker relay Z1 corresponds as in the first described case to the number 83633. There is therefore the same wiring scheme for the terminals of the contact fields of the relays M1 to M5 and MK as described in section 1.202. Relay Q consequently energizes after transmission of the first impulse series comprising eight impulses, in a circuit 2.102/6 which extends from battery, W$i$53 (right upper portion of Fig. 4), chain contacts 207$mk$, 198$m1$, 200$m2$, 202$m3$, terminal 8 interconnected with terminal I, $z1_1$, chain contacts 209$s4$, 211$s3$, 213$s2$, 215$s1$, 216$sk$, relay Q over winding I (QI), contact 324$h1$ to ground.

Contact 326$q$ shunts the winding I over which Q energized. The relay restores with a strong delay due to booster energization of its winding II by the discharge of the capacitor Co51 over contact 328$q$ (top right of Fig. 4). The release time of relay Q determines the pauses interposed between the individual impulse series.

The counting chain for the selection impulse series comprising the relays S1 to S4 and SK (top of Fig. 4) is always stepped by one step (see section 1.202) by discharges of the capacitor Co37 over contact 336$q$ of the relay Q. Contact 330$q$ disconnects the relay JT and opens the holding circuit of the respectively involved counting relays M1 to M5 and MK.

When the relay Q releases, it connects the impulse relay JT again at its contact 330$q$. Relay JT transmits the next impulse series and controls at the same time, at its contact 176$it$, the impulse counting chain, until relay Q is again energized responsive to the third selection impulse, in a circuit 2.102/8 from battery, W$i$53, chain contacts 207$mk$, 197$m1$, 199$m2$, 201$m3$, terminal 3 wired to terminal II, $z1_2$, 214$s1$, 216$sk$, QI, 324$h1$ to ground.

The above described operations are analogously repeated for the remaining digits 6—3—3 of the desired number 83633. The relay Q accordingly energizes in the next successive circuits 2.102/9 from battery, W$i$53, 207$mk$, 198$m1$, 6–III, $z1_3$, 212$s2$, 214$s1$, 216$sk$, QI, 324$h1$ to ground;

2.102/10 from battery, W$i$53, 207$mk$, 197$m1$, 199$m2$, 201$m3$, 3–IV, $z1_4$, 210$s3$, 212$s2$, 214$s1$, 216$sk$, QI, 324$h1$ to ground; and 2.102/11 from battery, W$i$53, 207$mk$, 197$m1$, 199$m2$, 201$m3$, 3–V, $z1_5$, 208$s4$, 210$s3$, 212$s2$, 214$s1$, 216$sk$, QI, 324$h1$ to ground.

The winding II of relay H1 (H1II, right upper part of Fig. 4) is oppositely energized to cause its release at the conclusion of the last impulse series and disconnects the selection apparatus, the opposite energization of winding H1II being effected in the circuit 2.102/12 from battery, W$i$53, H1II, IX–VI, $z1_6$, 215$s1$, 216$sk$, 326$q$, 324$h1$ to ground.

Contact 309$h1$ opens the holding circuit 2.102/4 for relay C4. Contact 344$h1$ opens to release relay Z1. Opening of contact 350$c4$ causes deenergization of relay C3 which releases with delay. The selection apparatus is now in normal position. The subscriber is again connected with the selection repeating robot apparatus as described in section 2.102/2.

2.103 Storing of the desired number in the selection repeating robot apparatus

The selection impulses produced as above described by the impulse contact 317$it$ (bottom of Fig. 4) or, as the case may be, produced by the dial contacts $nsi$ in a case where the subscriber dials instead of actuating a selection key, cause corresponding pulsing actuation of the line or impulse relay A (Fig. 5$a$) of the waiting apparatus shown in Figs. 5$a$–5$c$. Contact 6$a$ of relay A (Fig. 5$b$) transmits the impulses to the group selector GW connected to the conductors at the top right of Fig. 5$c$ by correspondingly interrupting the outgoing line loop. Relay C (Fig. 5$a$) remains during the selection operations in operated position because it is made slow-to-release by the shunt provided over contact 361$a$. Upon first release of relay A, relay V (Fig. 5$c$) is energized and connects at contact $v$13 the relay V1, the circuits to be considered being 2.103/1 extending from battery (Fig. 5$c$), VII, VI, 12$a$, 59$e$, 140$r1$, conductor 163 to Fig. 5$a$ and contact 11$c$ to ground; and 2.103/2 which may be traced from battery in Fig. 5$a$, V1II, V1I, 13$v$ and contact 311$c$ to ground.

Relay V1 closes its contacts 270$v1$ and 273$v1$ to shunt the respective windings I of the relays V and V1 so as to impart a slow-to-release action to these relays to keep them actuated during the impulsing. The slow-to-release relay V2 (Fig. 5$b$) is in addition energized over contact 14$v1$ of relay V1 in the circuit 2.103/3 from battery in Fig. 5$b$, winding of relay V2 and contact 14$v1$ to ground.

The operation of the contacts 15$v$, 16$v$ and 17$v$ of the relay V correspond to those described in section 1.102.

For the storing of the selected number in the selection repeating apparatus there are provided the relays I–V, F and K (Fig. 5$a$), forming a counting chain, further, the rotary switch DM (Fig. 5$a$), the storage capacitors Co11 to Co20 (Fig. 5$b$), and the voltage divider comprising the resistors W$i$1 to W$i$7 (Fig. 5$a$).

The counting chain is in steplike manner operated by discharges of the capacitor Co7 over contact 18$a$ of the relay A (see section 1.103). The voltage divider is connected to the exchange battery, as are the remaining switching means. With a 60 v. supply current, the voltages resulting over the resistors W$i$2 to W$i$5 will in each case amount to 6 v. and those at the resistors W$i$6 and W$i$7 will amount to 30 v.

The charging circuits for the storage capacitors will correspond to those described in section 1.103. For example, responsive to digit "1," the capacitor Co11 will be charged over the circuit 2.103/4 from resistor W$i$1 of the voltage divider shown at the bottom left of Fig. 5$a$, conductor 160 to Fig. 5$b$, resistor W$i$14, 271$u$, wiper $dm$II, capacitor Co11, wiper $dm$I, contact 47$s$, conductor 162 to Fig. 5$a$, contacts 40–1 and 38$k$ back to the other terminal of W$i$1.

The rotary switch having the magnet DM (bottom left of Fig. 5$a$) is switched by one step over a contact 46$s$ of relay S at the end of each impulse series. Contact 47$s$ disconnects the charging potential from the wiper *dm*I. Contact **48*s*** interrupts the holding circuits for the relays I to V, F and K of the counting chain (see also section 1.103).

2.104 Initiation of the selection repeating condition

It shall be assumed that the desired number is busy. The calling subscriber actuates the grounding key ET (bottom left of Fig. 4) in order to initiate the selection repeating condition or operation. Ground is thereby connected to the line or talking conductors 151 and 152 and the winding II of the differential relay X (Fig. 5*a*) in the selection repeating apparatus is consequently shunted. Relay X energizes and at its contact **54*x*** closes a circuit for relay O, the two circuits to be considered being 2.104/1 extending from battery in Fig. 5*a*, AI, **138*r***, winding I of relay X, *Dr*2I, **381*an***, preselector wiper VW*a*, conductor 151 to Fig. 4, impulse contact **317*it*, 314*c*3** and line conductor *a* to ground at the grounding key ET; and 2.104/2 from battery on conductor 160 in Fig. 5*b*, winding of relay O, **56*o*, 152*d*, 54*x*, 50*c*** to ground.

Relay O connects itself in a holding circuit over its contact **56*o* and contact 57*a*. At its contact 58*o*, relay O energizes relay E over its winding EI, in the circuit 2.104/3 from battery on conductor 160** in Fig. 5*b*, EI, **58*o*, 152*d*, 54*x* and contact 50*c*** to ground.

Contact **59*e*** of the relay E places ground potential on the plate of the tube R*o*1 shown in Fig. 5*c*. Relay Ü now operates in the plate circuit of this tube, the circuit being 2.104/4 from battery on conductor 169 in Fig. 5*c*, relay Ü, W*i* 23, R*o*1, repeater coil Ü2, W*i*24, **59*e*, 140*r*1, conductor 163** to Fig. 5*a* and over contact **11*c*** to ground.

Relay U at contact **60*ü*** connects ground to the plate tube R*o*2 thereby causing actuation of relay P in the circuit 2.104/5 from battery on conductor 169 in Fig. 5*c*, W*i*26, R*o*2, relay P, W*i*27, contact **60*ü*, 59*e*, 140*r*, conductor 163** to Fig. 5*a* and over contact **11*c*** to ground.

Relay P (Fig. 5*c*) causes actuation of relay P1 (Fig. 5*a*) in a circuit 2.104/6 extending from battery on the prominently shown vertical conductor branching in Fig. 5*a* from conductor 160, winding of relay P1, contact **61*p*** closed by relay P (Fig. 5*c*) and over contact **1201*r*2** to ground.

Relay X (Fig. 5*a*) releases responsive to restoration of the grounding key ET thereby causing actuation of the relays D and D1 (Fig. 5*b*) in the circuit 2.104/7 from battery on conductor 160 in Fig. 5*b*, windings of D1 and D, **63*e*, winding II of relay E (EII), 54*x*, 50*c*** to ground.

The current over winding II of relay E (EII) holds E operated until conclusion of the selection repeating condition. Contact **363*d* of the relay D opens a point in the private conductor 159/168** in Fig. 5*b* and connects at the same time the relay *Cr*1 (windings II and I) to the private conductor 168 leading to the group selector GW. Relay *Cr*1 upon energizing closes its contact **368*cr*1, thereby shunting its high resistance winding II and thus placing busy potential on the outgoing branch of the private conductor 168 leading to the group selector GW. Contact 362*d*** closes a holding circuit for relay C (Fig. 5*a*) and therewith also for the cutoff relay (not shown) of the preselector VW over the circuit 2.104/8 from conductor 154 (top left in Fig. 5*a*), preselector wiper VW*c*, **387*c*, 380*m*, winding of relay C, 362*d***, W*i*54, **377*r*/569*cr*1** to ground.

Contact **64*d*** (top left of Fig. 5*b*) opens responsive to energization of relay D (circuit 2.104/7) but the outgoing line loop remains closed over the contact **384*o* of the still operated relay O. The contacts 370*cr* and 371*cr*** (top left of Fig. 5*b*) prepare for maintaining the outgoing line loop after release of relay O. The group selector GW therefore remains seized during and after the actuation of the grounding key ET.

Relay O, at its contact **386*o* has connected the relay V2**. Relay *Cr*1, at its contact **369*cr*1** has connected the call separator (corresponding to the one described under 1.110) comprising the relays Y, N, G and W, the circuits for Y, N and G being 2.104/8*a* which extends from battery in Fig. 2*b*, YII, **108*w*, 116*t*, 161** to Fig. 5*a*, **369*cr*1** to ground; and 2.104/9 from battery in Fig. 5*b*, NI, GI, **208*v*2**, W*i*41, 161 to Fig. 5*a*, **369*cr*1** to ground.

The relays N and G at their respective contacts **106*n* and 107*g*** connect the relay W (Fig. 5*b*). Relay W at its contact **108*w*** opens the energizing circuit 2.104/8 of the relay Y but closes at the same time a holding circuit over the winding I of relay Y (YI), namely, circuit 2.104/10 which extends from battery in Fig. 5*a*, W*i*33, **128*y*, 111*w*, 112*y*, winding YI, 369*cr*1** to ground.

Relay A of the selection repeating apparatus releases when the calling subscriber replaces the receiver. Its contact **57*a* is thereby opened and thus releases the relay O. Relay $V_2$ also releases. After release of the relay O and during the release of relay V2**, relay *Lr* will energize in the circuit 2.104/11 extending from battery in Fig. 5*b*, *Lr*I, **131*r*, 118*t*, 385*o*, 192–2, 98*v*2, 81*u*, conductor 161** to Fig. 5*a*, and over **369*cr*1** to ground.

Relay *Lr* connects itself in a holding circuit over its contact **991*r*** (Fig. 5*b*) and at its contact **1001*r*** it switches in the relay *Lr*1 in the circuit.

2.104/12 which may be traced from battery in Fig. 5*c*, *Lr*1, **1001*r*, 59*e*, 140*r*1, 163** to Fig. 5*a* and to ground over contact **11*c***.

Contact **1011*r*** closes a circuit for relay *Lr*2 (Fig. 5*b*) and the latter connects the signal receiver to the line conductors over its contact **1031*r*2 and 1041*r*2 in the circuit 2.104/13 from conductor 164** in Fig. 5*b*, **1031*r*2**, *Co*6, conductor 165 to Fig. 5*c*, repeater coil ÜlI, *Co*33, ÜlII, conductor 166 to Fig. 5*b*, *Co*5, contact **1041*r*2 to conductor 167**.

Contact **1051*r*2** of the relay *Lr*2 connects the control grid of the tube R*o*2 in the signal receiver circuit. The structure and operation of the signal receiver correspond to those described in section 1.109. The busy signals received from the called line operate the relay P in the plate circuit of the tube R*o*2 of the signal receiver Fig. 5*c*. The holding winding I of the relay Y is shunted upon first release of the relay P in a circuit including the contacts **1091*r*, 110*p*, 388*z*** and relay Y consequently releases. Relay T is now energized over its winding I (TI) in the circuit 2.104/14 from battery in Fig. 5*a*, winding I of relay T (TI), **114*t***, W*i*34, **112*y*, 388*z*, 110*p*, 1091*r*, 369*cr*1** to ground.

Relay T closes a holding circuit for itself at its contact **115*t*** (Fig. 5*a*). Its contact **116*t* interrupts the circuit 2.104/9. The relays N and G now depend solely on the contact 110*p*** of the relay P. Since busy signals are being received, these relays remain operated. See also section 1.110.

The contact **118*t***, upon opening, has opened the holding circuit for the relay *Lr* (Fig. 5*b*). This relay deenergizes with some delay and at its contact **1011*r*** disconnects the relay *Lr*2 (Fig. 5*b*). The signal checking interval is therewith concluded. Relay P1 remains energized over the contacts **61*p* and 1201*r*2**.

There is at this time another holding circuit for the relay *Lr*1, namely, 2.104/15 from battery in Fig. 5*c*, winding of *Lr*1, 283–3, **1211*r*1, 59*e*, 140*r*1, conductor 163** to Fig. 5*a* and contact **11*c*** to ground.

2.105 Selection repeating apparatus repeats building up of call

The outgoing line loop is interrupted by the opening of contact **1361*r*. The line relay in the group selector GW thereupon deenergizes and shunts its private relay causing deenergization of the latter. These relays of the group selector GW have not been illustrated because their operation is well understood. The connection that has been built up is now released. The potential on the private conductor 168** of the waiting apparatus is removed by the release of the group selector and relay C*r*1 (Fig. 5*b*) deenergizes. At contact **369*cr*1**, the relay C*r*1 disconnects the relays N, G and W of the call or signal separator.

The reseizure of the group selector can take place only upon closure of the contact **3661*r*1** of the relay L*r*1. The circuit for this relay which has been described under 2.104/15 is after a predetermined interval opened by a contact of one of the relays I to V for counting the digit impulses, in the assumed case, by the contact 283–3. The counting chain is stepped over the contact **92*d*1 by the contact 93*h* of the relay H which is connected to a common 10 sec.-switching device over the contacts 3651*r*1 and 367*u*** (bottom of Fig. 5*a*).

Relay L*r*1 upon releasing closes its contact **3661*r*1**. Relay C*r*1 accordingly energizes again and the group selector GW is seized. Contact **369*cr*1** connects the relays Y, N, G and W again. Relay S now operates in the circuit 2.105/1 from battery in Fig. 5*a*, windings SII and SI of relay S, **78*dm*, 276*v*2, 277*u*, 278*r*1, 372*cr*1, 75*p*1, 1481*r*1, 383*o*** to ground.

Contact **48*s*** of the actuated relay S (left off center, Fig. 5*a*) disconnects the relay of the counting relays I–V that may be in operated position and also disconnects the relay T. The capacitor charge (see section 1.113) is cancelled over contact **285*t*** (Fig. 5*b*) of relay T (Fig. 5*a*) after release of the corresponding counting relay and during the release of relay T.

After the relay T releases, the relay S will drive the rotary switch into its home position by interplay with the rotary magnet DM (bottom left of Fig. 5*a*) and the latter will be stopped in such home position by the actuation of relay U. See in this connection section 1.106. The charge on the storage capacitor which is now connected to the control grid of the tube R*o*2 (Fig. 5*c*) causes release of the relay P and subsequently that of relay P. Relay P1 at its contact **82*p*1 frees the holding winding I of the relay U (U1** in Fig. 5*b*). Relay V is now energized over its winding III (VIII, bottom of Fig. 5*a*) in a circuit including contacts **83*p*1 and 84*v*. Relay V closes at contact 13*v*** a circuit for relay V1 (Fig. 5*a*) and V1, upon energizing closes its contact **14*v*1** to energize relay V2 (Fig. 5*b*). A circuit is now closed for the relay J (bottom of Fig. 5*a*) which coacts with relay H and thereby causes transmission of the stored impulse series in accordance with section 1.107. Relays P and P1 remain energized after the last impulse series is transmitted because the rotary switch DM has established connection with an uncharged storage capacitor as described in section 1.108. The holding winding I of the relay U (UI in Fig. 5*b*) is now shunted over contacts **81*u* and 82*p*1** and such relay releases Relay L*r* is now energized in the circuit 2.104/11. The operations described in section 2.104 are repeated.

At least one of the relays N or G will restore (see circuit 1.110.3) during the signal checking interval if the called line is found idle. The relay W thereafter releases also and at its contact **130*w*** closes a path for the actuation of relays R and T*h*1 in a circuit 2.105/2 from battery on conductor 160 in Fig. 5*b*, T*h*1, R, **153*x*, 130*w*, 1011*r*, conductor 161** to Fig. 5*a*, to ground over contact **369*cr*1**.

Contact **131*r*** opens the circuit for relay L*r* (winding L*r*I, left lower part of Fig. 5*b*). Relays T*h*1 and R continue to hold over contact **132*r*. Contact 133*r*** closes a circuit for relay R1 (right upper part of Fig. 5*a*). The contacts **138*r* and 139*r*** place ringing current on the subscriber's loop in the circuit 2.105/3 from the ringing current source ≃ (upper part of Fig. 5*a*), **138*r***, XI, D*r*2I, **381*m***, preselector wiper VW*a*, conductor 151 to Fig. 4, **317*it*, 314*c*3**, conductor *a*, switch hook contacts GU, ringer WW, C*o*25, conductor *b*, **315*c*3, conductor 152** to Fig. 5*a*, preselector wiper VW*b*, **382*m***, D*r*2II, **150*e*, 151*o*, contact 139*r*** to ground.

If desired, a special signal device may be connected to the winding III of the relay choke D*r*1, over the terminal 18 (bottom left of Fig. 5*a*) as described under 1.110.3.

Relay X (Fig. 5*a*) will energize when the subscriber who has initiated the call removes his receiver because its winding II is shunted over the contacts **150*e* and 151*o*. Contact 153*x*** of the energized relay X disconnects the relay R (Fig. 5*b*) and the latter upon releasing opens its contacts **138*r* and 139*r* (circuit (2.105/3) to disconnect the ringing current. Contact 54*x*** (Fig. 5*b*) disconnects the relay E. Relays D and D1 remain energized over a circuit including the same contact **54*x***. The circuit for relay L*r*1 (Fig. 5*c*) is now interrupted at contact **59*e***. Relay X (Fig. 5*a*) releases upon opening of the contact **150*e*** and disconnects the relays D and D1 (Fig. 5*b*) at its contact **54*x*. Contact 363*d* of the relay D connects the private conductor 159—168** (top of Fig. 5*b*) through to the group selector. Relay C*r*1 prepares to deenergize. Its contact **369*cr*1** (right central part of Fig. 5*a*) disconnects ground from conductor 161 thereby disconnecting the relays of the call separator. Contacts **138*r* and 139*r*** have connected the relay A (Fig. 5*a*) to the subscriber loop and A has energized.

If the called subscriber does not answer within a predetermined time, the thermo relay T*h*1 will energize in the circuit 2.105/2. Its contact **154*th*1** will shunt the holding winding II of relay E (EII in Fig. 5*b*). Relay E and consequently relays D and D1 release. Relay C*r*1 releases after D and interrupts the outgoing line loop at its contacts **370*cr*1 and 371*cr*1 thereby causing the group selector to release in known manner. Contacts 361*a* and 362*d*** cause release of the relay C (top of Fig. 5*a*) by shunting it, and the selection repeating apparatus thereupon returns to normal.

If the subscriber who has initiated the call and has been called as described replaces his receiver before the selection repeating apparatus is automatically released by the actuation of the thermo relay T*h*1, the relay C*r*1 will release by revertive release, if such is provided and will open its contact **369*cr*1** (Fig. 5*a*) thereby removing ground from conductor 161 leading to Fig. 5*b* and thus causing release of the relay R. During the release interval of R, the private conductor coming from the preselector is briefly interrupted at the contacts **569*cr*1 and 377*r***. The cutoff relay of the preselector (not shown) thereupon deenergizes. Relay C releases also and the selection repeating apparatus returns to normal.

If the apparatus is used in a P. B. X and if the use of the selection repeating apparatus is to be prevented for making outside calls, the terminals 20 (left lower part of Fig. 5*a*) are connected together. Depending upon the dialing of the exchange digit which shall be assumed to be digit "0," the relay M will energize as described in section 1.116. Its contact **380*m*** removes the shunt around its holding winding I (winding MI, top left of Fig. 5*a*). Relay M holds in series with relay C for the duration of the connection. Its contacts **381*m* and 382*m*** (top of Fig. 5*a*) connect the line conductors 151 and 152 through to the group selector over the conductors 155 and 158.

In case of calls from stations in which the first call is not effected immediately after seizure but under certain circumstances up to about 10 sec. later, but where the connector transmits a call signal which is transmitted back from the group selector in the form of an amplified current, such call signal will cause energization of the relay Z disposed in the private conductor 168 shown in Fig. 5b. Relay Z closes at contact 373z a holding circuit for its winding III (ZIII, left central part of Fig. 5b) and also closes at its contact 374z an energizing circuit for the winding I of relay T (TI, right central part of Fig. 5a), the two circuits being 2.105/3a from battery on conductor 160 in Fig. 5b, ZIII, 373z, 81u conductor 161 to Fig. 5a to ground over contact 369cr1; and 2.105/4 from battery on conductor 160, TI, 114t, Wi34, 374z, terminal 56 to similarly numbered terminal 56 (left center of Fig. 5b), 81u, conductor 161 to Fig. 5a and over 369cr1 to ground.

Contact 388z disconnects the winding I of relay Y (YI, right central part of Fig. 5a). Relay W deenergizes and causes actuation of relay R which initiates the ringing to the waiting subscriber under some circumstances even before receipt of the first ringback signal.

2.106 Selection by the selection apparatus with replaced receiver

The following explanations are concerned with switching operations taking place in the special apparatus according to the invention, that is, when the selection apparatus and the selection repeating apparatus operate in response to a single switching operation executed by the calling subscriber.

It is again important in such a case that the selection apparatus automatically simulates the operation of the grounding key which would otherwise be necessary at the subscriber's station so as to initiate the selection repeating operation. See in this connection section 1.301.

When the subscriber depresses one of the number keys, for example, the key T1, without removing his hand set or receiver, there will be completed the circuits 2.102/1 to 2.104/4 as described in section 2.102. Relay C4 will close a holding circuit for its winding II (C4II, lower left of Fig. 4) in a circuit 2.106/1 from battery, C4II, 309h1, 308c4, Wi52, 307c5, 306c4, C5, error key JRR to ground.

Relay C5 is also energized and remains energized in this circuit which is interrupted by contact 309h1 of relay H1 upon transmitting the impulse series. The relays C4 and C5 release, the latter relay (C5) releasing with some delay. The armature of the slow-to-release relay Q is still in actuated position and the relay C3 deenergizes after C5, and ground is therefore connected to the line conductors 151 and 152, after release of C4 and during the release of C5, in the circuit 2.106/2 which extends from ground at the error key JRR, 352q, 354c4, 355c5 to conductor 151 and from 151 over 317it, 314c3 to conductor 152.

Relay X (Fig. 5a) in the selection repeating apparatus thereupon energizes and closes its contact 54x (Fig. 5b) to initiate the operations described under 2.104. The selection repeating apparatus now operates as described in sections 2.104 and 2.105 and informs the subscriber by revertive call of the successful automatic completion of the connection.

As may be seen from Fig. 4, the holding winding I of the relay An (lower left of the drawing) is supplied with a booster current from the capacitor Co54 after release of the number or selection key that may have been depressed. The relay An therefore releases with a strong delay. The corresponding long release interval of An secures completion of the circuit 2.102.7 after the expiration of the maximal hunting time of the preselector VW in the exchange. This prevents false selections which might otherwise occur wtih replaced receiver and brief actuation of a selection key due to the transmission of impulses by the selection apparatus before the preselector has had time to seize an idle group selector.

The circuit of Fig. 4 may for this purpose also be arranged as described in section 1.300, that is, it may be modified as indicated in Fig. 4a. The line or talking conductors 151 and 152 are crossed or exchanged in the preselector VW in a manner similar to the one shown in Fig. 2d. There is therefore during the hunting of the preselector minus potential on the line conductor 151 and plus potential on the conductor 152. Relay Dr3 does not operate under these conditions because its energizing winding I (Dr3I) which is connected in the line loop by contact 314c3 is shunted by the rectifier G113. The potentials on the line conductors are exchanged responsive to the switching through thereof from the preselector to an idle group selector or, rather to say, to the selection repeating apparatus disposed ahead of the group selector and the rectifier G113 accordingly blocks current flow. Relay Dr3 energizes over its winding I (Dr3I) and completes a holding circuit for its winding II (Dr3II) which extends over its contact 393dr3 and contact 392c4 of the relay C4. The rectifier G113 is disconnected at contact 391dr3 and shunts the winding I. Contact 394dr4 prevents completion of the circuit 2.102/7 before seizure of an idle group selector. The release of relay An does not have to be especially slow in this case but the relay can close its contact 171an in the corresponding circuit immediately upon release of the selection or number key that may have been actuated.

2.107 Premature release of the selection apparatus and the selection repeating apparatus The selection apparatus may be prematurely released by actuating the error key JRR (bottom left of Fig. 4) whether the operation thereof was initiated with the receiver removed or restored. The actuation of the key JRR interrupts in the first case (receiver removed) the circuit 2.102/5 and in the second case (receiver restored) it interrupts the circuit 2.106/1. The relay C4, rather to say C4 and C5 and subsequently C3 thereupon deenergize. Contact 316c3 opens or causes the opening of all circuits that may be closed at that time. The selection apparatus immediately returns to normal.

Incident to selection with the receiver removed (off hook), the selection apparatus may also be prematurely released by replacing the reecviver. The circuit 2.105/5 is in such case likewise interrupted, at the switch hook contacts GU, causing release of the relay C4 and subsequently of relay C3.

The selection repeating apparatus may be prematurely released by depressing the key ET. Relay X is thereby actuated and at its contact 54x disconnects the relay E. The same contact thereupon disconnects the relays D and D1 responsive to release of relay X upon restoration of the key ET. The waiting condition is thereby cancelled. See in this connection the circuit 2.105.

The relay C which is shunted by the contacts 361a and 362a restores. Since the switch wiper dmIII (top of Fig. 5a) is not in the first position "1," the contact 387c will interrupt the seizure circuit extending to the group selector. The line loop to the group selector is after release of relay D opened at contacts 370cr1 and 371cr1. The group selector releases; the preselector returns to its normal position. Contact 378c closes in the selection repeating apparatus a circuit for the relay S which interacts with the rotary magnet DM to step the rotary switch into its home position in which it is stopped by the release of relay S whose circuit is interrupted by wiper dmIV (left lower part of Fig. 5a). The selection repeating apparatus is thus at normal and ready for serving in a subsequent call.

The selection apparatus of the invention may be referred to as a call selection robot as distinguished from the selection repeating robot. Both robots may be combined in a structural unit associated with a subscriber's line terminating in known preselector means at an exchange (Fig. 1 and Figs. 2a to 2d) for automatically extending calls over known switches including selectors and connectors in the exchange. The two robots may also be separate units (Fig. 3 and Figs. 4 to 5c). In such case, the call selection robot is associated with a subscriber's line terminating in known preselector means and the selection repeating robot is associated with known exchange group selector means accessible to the preselector means. In its broadest aspects, the invention provides means including call selection keys requiring only a single operation by a calling subscriber to cause the robots to extend a desired call automatically: to repeat the call automatically if the called line is busy until it is found idle; to perform all supervising functions incident to the setting up of the call; and to signal the calling subscriber by revertive call when the called line is found idle and seized by the connector involved in the corresponding connection. The call selection robot comprises essentially chains for respectively counting the digits in a called number selected by the calling party by depressing the corresponding number key and the number of impulses in each digit, a contact field effected by the counting chains, and impulse means for transmitting impulse series corresponding to said digits. The selection repeating robot comprises essentially means for transmitting the impulse series received from the selection robot to set the switches in the exchange so as to extend the call; means for simultaneously storing the transmitted digits; signal receiver means for checking the signals (busy or ringback) received from the called line to which the call has been extended; call signal separator or discriminator means for evaluating the corresponding signals; means for releasing the corresponding call if the called line is busy and means for thereafter repeating the call until the called line is idle; and means for thereafter ringing the calling line to inform such line that the desired called line has been seized.

What is believed to be new and desired to have protected by Letters Patent is defined in the appended claims.

I claim:

1. In an automatic telephone system having subscribers' lines, selection robot apparatus associated with a calling line for automatically selecting predetermined called lines, selection repeating robot apparatus for automatically storing diigts transmitted and designating a desired called line and for automatically extending a call to said called line and for supervising the operating condition of said called line to which a call is to be extended and including means for utilizing said stored digits for the purpose of automatically successively repeating the building up of the connection to said called line if such line is found busy and having means for ringing the calling line when said called line is found idle, switching means at said calling line for separately selectively initiating the operations of said selection robot apparatus and of said selection repeating robot apparatus, and cooperating circuit switching means respectively included in said selection robot apparatus and said selection repeating robot apparatus, said cooperating circuit switching means being operatively responsive solely to the actuation of the switching means for initiating the operations of said selection robot apparatus for causing operative actuation of said selection repeating robot apparatus.

2. A system and cooperation of parts according to claim 1, comprising supervising means in said selection repeating robot apparatus for instantly ascertaining the operating condition of the desired called line to which a call is being extended, and means responsive to said supervising means for respectively calling the ringing line if the called line is found idle and for initiating repeated selection thereof if such line is found busy.

3. A system and cooperation of parts according to claim 2, comprising means for causing the operation of said selection repeater robot apparatus responsive to separate actuation of the corresponding operation-initiating switching means by the calling subscriber.

4. A system and cooperation of parts according to claim 1, wherein said selection robot apparatus is disposed separately from said selection repeating robot apparatus, and preselector means for connectng said selection robot apparatus with said selection repeater robot apparatus.

5. A system and cooperation of parts according to claim 1, comprising means for starting the operation of said selection robot apparatus responsive to completion of the actuation of the corresponding operation-initiating switching means by the calling subscriber.

6. A system and cooperation of parts according to claim 1, comprising means included in said cooperating circuit switching means for automatically grounding a line conductor at the calling line, differential relay means energized by such grounding, and means controlled by said differential relay means for initiating the operation of said selection repeating robot apparatus.

7. A system and cooperation of parts according to claim 6, comprising means responsive to separate actuation of said operation-initiating switching means by the subscriber at the calling line for inhibiting the grounding of said line conductor.

8. A system and cooperation of parts according to claim 6, comprising means controlled by the actuation of the operation-initiating switching means for said selection repeater robot apparatus, during the operation of such apparatus, for restoring said selection robot apparatus and said selection repeating robot apparatus.

9. A system and cooperation of parts according to claim 8, comprising additional switching means controlled by the subscriber at the calling line for governing the operative effect of said operation-initiating switching means for said selection repeating robot apparatus.

10. A system and cooperation of parts according to claim 6, comprising means controlled by the actuation of the operation-initiating switching means for said selection repeating robot apparatus, after connection is established with the called line, for holding the called line to enable the party at the calling line to extend a call to another line for conference or call transfer purposes.

11. A system and cooperation of parts according to claim 1, comprising selection key means at the calling station for setting up a call to a desired called station by means of said selection robot apparatus, and blocking means for inhibiting the initiation of the operations of said selection robot apparatus responsive to actuation of said selection key means.

12. A system and cooperation of parts according to claim 11, comprising means responsive to the actuation of said separate operation-initiating switching means at the calling line for inhibiting the operation of said blocking means.

13. A system and cooperation of parts according to claim 1, comprising means dependent on the seizure of an idle group selector in the exchange for initiating the operation of said selection robot.

14. A system and circuit arrangement according to claim 1, comprising means for placing predetermined potentials on the line conductors extending from said selection robot apparatus to the exchange, circuit means controlled by said potentials for inhibiting the operations of said selection repeating robot apparatus pending seizure of an idle selector means in said exchange, and means for exchanging said potentials on said line conductors upon seizure of an idle selector means to initiate the operations of said selection repeater robot means.

References Cited in the file of this patent

UNITED STATES PATENTS

| | | |
|---|---|---|
| 2,277,206 | Cesareo et al. | Mar. 24, 1942 |
| 2,502,517 | Goldberger | Apr. 4, 1950 |
| 2,522,119 | Kaelin | Sept. 12, 1950 |
| 2,537,188 | Kaelin | Jan. 9, 1951 |
| 2,561,298 | Vanheerswynghels | July 17, 1951 |
| 2,576,189 | Olliver | Nov. 27, 1951 |